US012293735B2

(12) United States Patent
Weng et al.

(10) Patent No.: US 12,293,735 B2
(45) Date of Patent: May 6, 2025

(54) DRIVING METHOD OF LIQUID CRYSTAL DISPLAY PANEL AND LIQUID CRYSTAL DISPLAY PANEL

(71) Applicants: FUZHOU BOE OPTOELECTRONICS TECHNOLOGY CO., LTD., Fuzhou (CN); BOE TECHNOLOGY GROUP CO., LTD., Beijing (CN)

(72) Inventors: Zuwei Weng, Beijing (CN); Yichiang Lai, Beijing (CN); Bo Hu, Beijing (CN)

(73) Assignees: FUZHOU BOE OPTOELECTRONICS TECHNOLOGY CO., LTD., Fujian (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 18/577,838

(22) PCT Filed: Aug. 25, 2022

(86) PCT No.: PCT/CN2022/114839
§ 371 (c)(1),
(2) Date: Jan. 9, 2024

(87) PCT Pub. No.: WO2024/040523
PCT Pub. Date: Feb. 29, 2024

(65) Prior Publication Data
US 2025/0006150 A1 Jan. 2, 2025

(51) Int. Cl.
*G09G 3/36* (2006.01)

(52) U.S. Cl.
CPC ......... *G09G 3/3614* (2013.01); *G09G 3/3688* (2013.01); *G09G 2300/0426* (2013.01);
(Continued)

(58) Field of Classification Search
CPC .. G09G 3/3614; G09G 3/3648; G09G 3/3688; G09G 3/36; G09G 3/3696;
(Continued)

(56) References Cited

U.S. PATENT DOCUMENTS 11,189,241 B2 11/2021 Gao
2002/0130829 A1* 9/2002 Ilda ...................... G09G 3/3655 345/87

(Continued)

FOREIGN PATENT DOCUMENTS

CN 108182915 A * 6/2018
CN 110428790 A 11/2019

(Continued)

*Primary Examiner* — Dong Hui Liang
(74) *Attorney, Agent, or Firm* — Dilworth & Barrese, LLP.; Michael J. Musella, Esq.

(57) ABSTRACT

A liquid crystal display panel and a driving method of a liquid crystal display panel. The driving method includes: providing a first gate signal to a first gate line corresponding to a first row of sub-pixels among the plurality of rows of sub-pixels, in which the first gate signal includes an on period and an off period used to control the first row of sub-pixels to be turned on and off respectively; writing, during the on period of the first gate signal, a plurality of first data signals to sub-pixels among the first row of sub-pixels through the plurality of data lines, and during the on period of the first gate signal, a first writing time length of a negative polarity data signal is less than a second writing time length of a positive polarity data signal.

19 Claims, 14 Drawing Sheets

(52) U.S. Cl.
CPC . *G09G 2310/0297* (2013.01); *G09G 2310/08* (2013.01); *G09G 2320/0257* (2013.01)

(58) Field of Classification Search
CPC ...... G09G 3/3655; G09G 3/20; G09G 3/3607; G09G 3/3677; G09G 2320/0247; G09G 2320/0233; G09G 2320/0209; G09G 2300/0426; G09G 2300/0452
See application file for complete search history.

(56) References Cited

U.S. PATENT DOCUMENTS

| | | | | |
|---|---|---|---|---|
| 2005/0104835 | A1* | 5/2005 | Misonou | G09G 3/3614 345/96 |
| 2021/0118368 | A1 | 4/2021 | In et al. | |
| 2023/0029855 | A1* | 2/2023 | Shimada | G03B 21/006 |
| 2023/0230556 | A1* | 7/2023 | Tsuchi | G09G 3/2096 345/209 |

FOREIGN PATENT DOCUMENTS

| | | | |
|---|---|---|---|
| CN | 110956929 | A | 4/2020 |
| CN | 111276109 | A | 6/2020 |
| CN | 111679527 | A | 9/2020 |
| JP | 2002108288 | A | 4/2002 |

* cited by examiner

N-th Image Frame

| | | | |
|---|---|---|---|
| - | + | - | + |
| - | + | - | + |
| - | + | - | + |
| - | + | - | + |

FIG. 2C (N+1)-th Image Frame

| | | | |
|---|---|---|---|
| + | - | + | - |
| + | - | + | - |
| + | - | + | - |
| + | - | + | - |

FIG. 2D

DRIVING METHOD OF LIQUID CRYSTAL DISPLAY PANEL AND LIQUID CRYSTAL DISPLAY PANEL

TECHNICAL FIELD

Embodiments of the present disclosure relate to a driving method of a liquid crystal display panel and a liquid crystal display panel.

BACKGROUND

With the rapid development of display technology, display panels are increasingly developing towards high integration and low cost. Liquid Crystal Display (LCD) is a high-tech that has developed rapidly in the past two decades. It has been widely used in flat display devices because of advantages of being thinner and lighter, low radiation, high contrast, fast response speed and low power consumption, etc.

SUMMARY

At least one embodiment of the present disclosure provides a driving method of a liquid crystal display panel, in which the liquid crystal display panel comprises a pixel array, the pixel array comprises a plurality of gate lines, a plurality of data lines and a plurality of sub-pixels, the plurality of sub-pixels are arranged in a plurality of rows and a plurality of columns, each of the plurality of gate lines provides a gate signal for at least one row of sub-pixels, each of the plurality of data lines provides a data signal for at least one column of sub-pixels, each sub-pixel is connected with a corresponding gate line and a corresponding data line, and the driving method comprises: providing a first gate signal to a first gate line corresponding to a first row of sub-pixels among the plurality of rows of sub-pixels, wherein the first gate signal comprises an on period and an off period used to control the first row of sub-pixels to be turned on and off respectively; writing, during the on period of the first gate signal, a plurality of first data signals to sub-pixels among the first row of sub-pixels through the plurality of data lines, wherein the plurality of first data signals comprise a positive polarity data signal and a negative polarity data signal, and during the on period of the first gate signal, a first writing time length of the negative polarity data signal is less than a second writing time length of the positive polarity data signal.

For example, in the driving method provided by at least one embodiment of the present disclosure, a delay time of the negative polarity data signal relative to a starting time point of the on period corresponding to the first gate signal is a first time length, a delay time of the positive polarity data signal relative to the starting time point of the on period corresponding to the first gate signal is a second time length, and the first time length is greater than the second time length, so that the first writing time length of the negative polarity data signal is less than the second writing time length of the positive polarity data signal during the on period of the first gate signal.

For example, in the driving method provided by at least one embodiment of the present disclosure, the starting time point of the on period corresponding to the first gate signal relative to the negative polarity data signal and the starting time point of the on period corresponding to the first gate signal relative to the positive polarity data signal are the same or different.

For example, in the driving method provided by at least one embodiment of the present disclosure, the first gate signal further comprises a transition period between the on period and the off period adjacent to each other, the first time length is greater than the second time length by a preset time length, and the preset time length is a difference between a writing time length of the negative polarity data signal and a writing time length of the positive polarity data signal during the transition period of the first gate signal.

For example, in the driving method provided by at least one embodiment of the present disclosure, each of the plurality of data lines provides data signals for two adjacent columns of sub-pixels, during the on period of the first gate signal, each of the plurality of data lines provides a positive polarity data signal and a negative polarity data signal for a first sub-pixel and a second sub-pixel located in a same row and in two adjacent columns, respectively, the on period of the first gate signal comprises a first sub-on period and a second sub-on period, the positive polarity data signal is applied to the first sub-pixel during the first sub-on period, the negative polarity data signal is applied to the second sub-pixel during the second sub-on period, and a time length of the first sub-on period is greater than a time length of the second sub-on period.

For example, in the driving method provided by at least one embodiment of the present disclosure, each of the plurality of sub-pixels comprises a pixel electrode, and each of the plurality of data lines provides the positive polarity data signal to the pixel electrode of the first sub-pixel through a first multiplexing toggle switching element, and provides the negative polarity data signal to the pixel electrode of the second sub-pixel through a second multiplexing toggle switching element.

For example, in the driving method provided by at least one embodiment of the present disclosure, the first multiplexing toggle switching element is connected with a first control line to receive a first control signal provided by the first control line, the first multiplexing toggle switching element is configured to be turned on and off in response to a control of the first control signal, the second multiplexing toggle switching element is connected with a second control line to receive a second control signal provided by the second control line, and the second multiplexing toggle switching element is configured to be turned on and off in response to a control of the second control signal.

For example, in the driving method provided by at least one embodiment of the present disclosure, the first sub-on period and the second sub-on period are the same as an on period of the first multiplexing toggle switching element and an on period of the second multiplexing toggle switching element, respectively.

For example, in the driving method provided by at least one embodiment of the present disclosure, the first multiplexing toggle switching element and the second multiplexing toggle switching element are disposed at a periphery of the liquid crystal display panel, one column of sub-pixels in which the first sub-pixel is located share the first multiplexing toggle switching element, and one column of sub-pixels in which the second sub-pixel is located share the second multiplexing toggle switching element.

For example, in the driving method provided by at least one embodiment of the present disclosure, the first multiplexing toggle switching element is disposed in the first sub-pixel, and the second multiplexing toggle switching element is disposed in the second sub-pixel.

For example, in the driving method provided by at least one embodiment of the present disclosure, each of the plurality of sub-pixels further comprises a pixel switching element, the pixel switching element is connected with a corresponding gate line to receive a gate signal provided by the corresponding gate line, the pixel switching element and the first multiplexing toggle switching element in the first sub-pixel are connected in series between the data line and the pixel electrode, and the pixel switching element and the second multiplexing toggle switching element in the second sub-pixel are connected in series between the data line and the pixel electrode.

At least one embodiment of the present disclosure also provides a liquid crystal display panel, comprising a pixel array, wherein the pixel array comprises a plurality of gate lines, a plurality of data lines and a plurality of sub-pixels, the plurality of sub-pixels are arranged in a plurality of rows and a plurality of columns, each of the plurality of gate lines provides a gate signal for one row of sub-pixels, each of the plurality of data lines provides data signals for two adjacent columns of sub-pixels, and each of the plurality of sub-pixels is connected with a corresponding gate line and a corresponding data line, a first gate line corresponding to a first row of sub-pixels among the plurality of rows of sub-pixels is configured to provide a first gate signal to the first row of sub-pixels, wherein the first gate signal comprises an on period and an off period used to control the first row of sub-pixels to be turned on and off respectively, each of the plurality of data lines is configured to provide, during the on period of the first gate signal, a positive polarity data signal for a first sub-pixel in two adjacent columns and a negative polarity data signal for a second sub-pixel in the two adjacent columns, respectively; during the on period of the first gate signal, each of the plurality of data lines is configured such that a first writing time length of the negative polarity data signal is less than a second writing time length of the positive polarity data signal, the on period of the first gate signal comprises a first sub-on period and a second sub-on period, during the on period of the first gate signal, each of the plurality of data lines being configured such that the first writing time length of the negative polarity data signal is less than the second writing time length of the positive polarity data signal, comprises: the positive polarity data signal being applied to the first sub-pixel during the first sub-on period, the negative polarity data signal being applied to the second sub-pixel during the second sub-on period, and a time length of the first sub-on period being greater than a time length of the second sub-on period.

For example, in the liquid crystal display panel provided by at least one embodiment of the present disclosure, each of the plurality of sub-pixels comprises a pixel electrode, and each of the plurality of data lines is electrically connected with the pixel electrode of the first sub-pixel through a first multiplexing toggle switching element, and is electrically connected with the pixel electrode of the second sub-pixel through a second multiplexing toggle switching element.

For example, in the liquid crystal display panel provided by at least one embodiment of the present disclosure, the first multiplexing toggle switching element is connected with a first control line to receive a first control signal provided by the first control line, the first multiplexing toggle switching element is configured to be turned on and off in response to a control of the first control signal, the second multiplexing toggle switching element is connected with a second control line to receive a second control signal provided by the second control line, and the second multiplexing toggle switching element is configured to be turned on and off in response to a control of the second control signal.

For example, in the liquid crystal display panel provided by at least one embodiment of the present disclosure, the first multiplexing toggle switching element and the second multiplexing toggle switching element are disposed at a periphery of the liquid crystal display panel, one column of sub-pixels in which the first sub-pixel is located share the first multiplexing toggle switching element, and one column of sub-pixels in which the second sub-pixel is located share the second multiplexing toggle switching element.

For example, in the liquid crystal display panel provided by at least one embodiment of the present disclosure, the first multiplexing toggle switching element is disposed in the first sub-pixel, and the second multiplexing toggle switching element is disposed in the second sub-pixel.

For example, in the liquid crystal display panel provided by at least one embodiment of the present disclosure, each of the plurality of sub-pixels further comprises a pixel switching element, the pixel switching element is connected with a corresponding gate line to receive a gate signal provided by the corresponding gate line, the pixel switching element in the first sub-pixel and the first multiplexing toggle switching element are connected in series between the data line and the pixel electrode, and the pixel switching element in the second sub-pixel and the second multiplexing toggle switching element are connected in series between the data line and the pixel electrode.

BRIEF DESCRIPTION OF DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

FIGS. 2C and 2D are schematic diagrams of a polarity inversion driving mode provided by at least one embodiment of the present disclosure;

DETAILED DESCRIPTION

In order to make objects, technical solutions, and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and in the case where the position of the object which is described is changed, the relative position relationship may be changed accordingly.

Figure 1A:
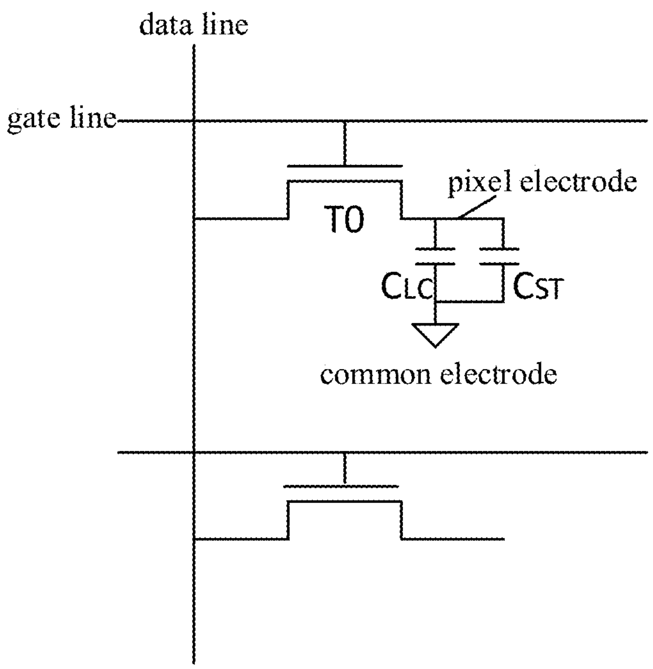
FIG. 1A shows an equivalent circuit of a sub-pixel in a liquid crystal display panel.
Figure 1B:
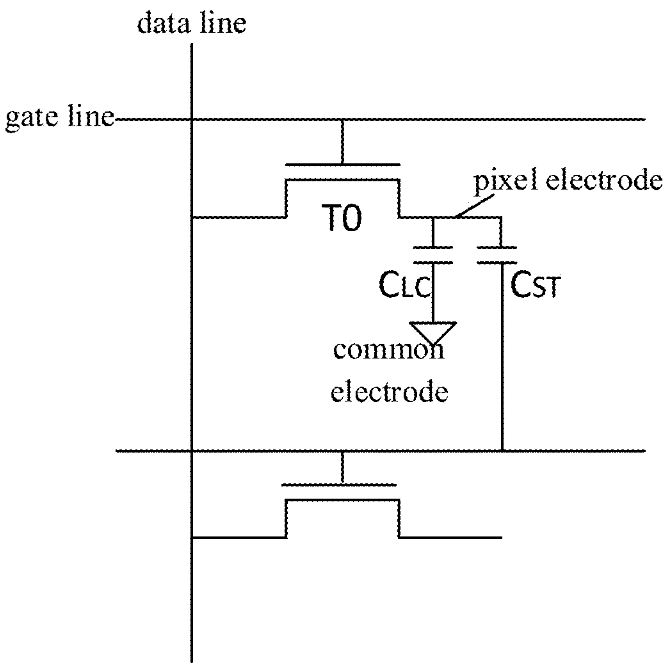
FIG. 1B shows an equivalent circuit of a sub-pixel in another liquid crystal display panel.

In a liquid crystal display panel, liquid crystal is a non-conductive dielectric layer, for example, sandwiched between a pixel electrode disposed on an array substrate and a common electrode disposed on a color filter substrate, or for example, covering a pixel electrode and a common electrode which are simultaneously disposed on the array substrate and insulated from each other. The liquid crystal display panel includes a pixel array, the pixel array includes a plurality of rows and a plurality of columns of pixels, and each pixel used for displaying a single pixel point in an image includes a plurality of sub-pixels respectively used for controlling the display of a certain primary color (e.g., red, green and blue). FIG. 1A shows an equivalent circuit of a sub-pixel in a liquid crystal display panel. FIG. 1B shows an equivalent circuit of a sub-pixel in another liquid crystal display panel.

As shown in FIGS. 1A and 1B, the sub-pixel includes a pixel switching element T0, a liquid crystal capacitor $C_{LC}$ and a storage capacitor $C_{ST}$. The pixel switching element T0 can be, for example, a thin film transistor, the first electrode (e.g., drain electrode) of the thin film transistor is electrically connected with the pixel electrode, the second electrode (e.g., source electrode) of the thin film transistor is electrically connected with the data line corresponding to the pixel column in which the sub-pixel is located, and the control electrode (e.g., gate electrode) of the thin film transistor is electrically connected with the gate line corresponding to the pixel row in which the sub-pixel is located. Liquid crystal molecules are located between the pixel electrode and the common electrode, to form a liquid crystal capacitor $C_{LC}$ for storing a data signal written through the pixel switching element T0. The storage capacitor $C_{ST}$ is formed by overlapping between the pixel electrode and a potential reference electrode. For example, the storage capacitor has two structural forms depending on different potential reference electrodes. One structural form takes the common electrode as the potential reference electrode, which is called $C_{ST}$-on-COM, as shown in FIG. 1A. The other structural form takes the gate line of the previous row (or the next row) of the pixel as the potential reference electrode, which is called $C_{ST}$-on-Gate, as shown in FIG. 1B.

In the operation process of the liquid crystal display panel, in order to avoid the polarization of the liquid crystal molecules, it is necessary to apply a voltage signal with changed polarity (positive and negative) to the liquid crystal molecules, so as to realize the AC driving of the liquid crystal molecules.

As shown in FIGS. 1A and 1B, if the potential of the common electrode remains constant, the AC driving of the liquid crystal molecules is realized by making the potential of the other electrode of the liquid crystal capacitor (i.e., the pixel electrode) high and low relative to the potential of the common electrode, and this AC driving mode is called DC voltage driving of common electrode. In some other embodiments of the present disclosure, if the potential of the common electrode jumps between image frames to realize the AC driving of the liquid crystal molecules, this AC driving mode is a voltage jump driving mode of common electrode.

Figure 1C:
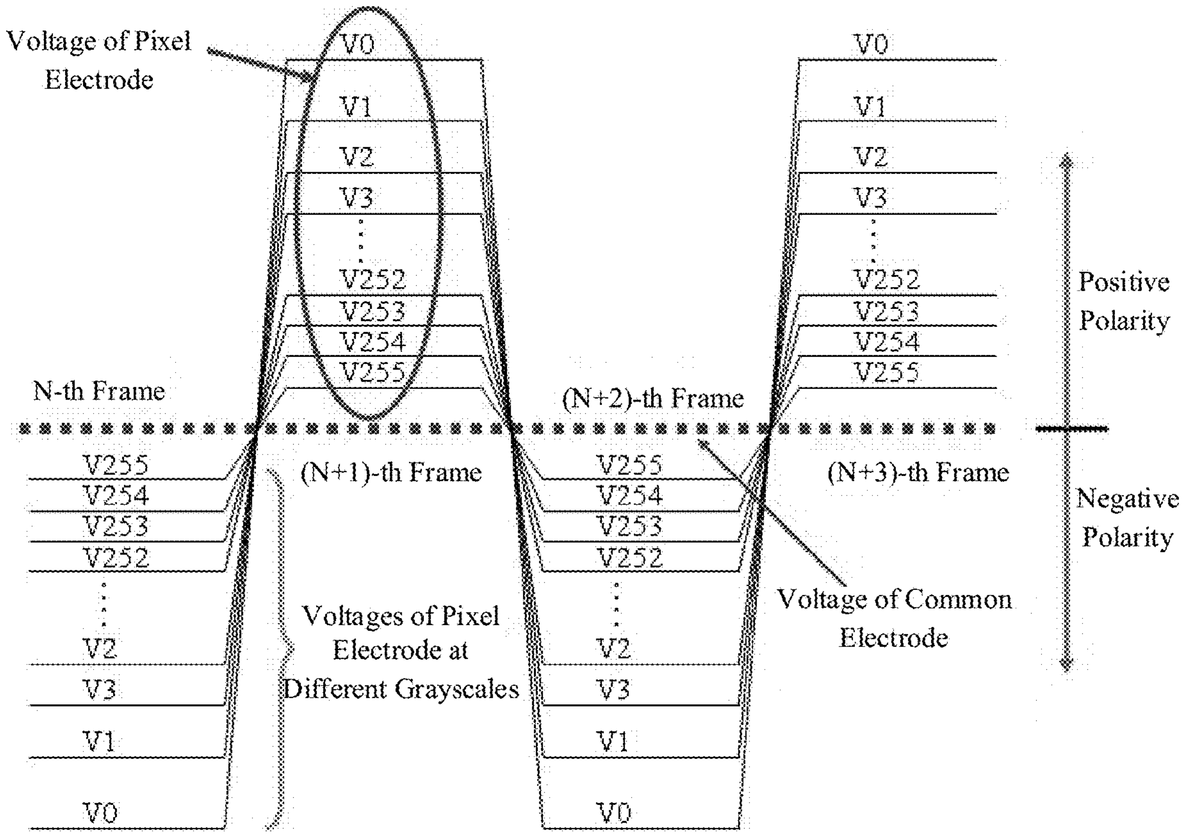
FIG. 1C is a voltage waveform diagram for DC voltage driving of common electrode.

FIG. 1C is a voltage waveform diagram for DC voltage driving of common electrode.

As shown in FIG. 1C, the voltage of the common electrode is fixed, and the voltage of the pixel electrode varies up and down according to the grayscale. The example of FIG. 1C shows the voltage waveform change of the pixel electrode in terms of 256 grayscales. For example, for the N-th image frame, the voltage of the common electrode is higher than the voltage of the pixel electrode, and the liquid crystal molecules are negatively polarized; for the (N+1)-th image frame, the voltage of the common electrode is lower than the voltage of the pixel electrode, and the liquid crystal molecules are positively polarized. Whether being positively polarized or negatively polarized, liquid crystal molecules can achieve different grayscales.

As shown in FIGS. 1A and 1B, the gate electrode of the pixel switching element T0 is connected with a gate line to receive a gate signal, and the source electrode of the pixel switching element T0 is connected with a data line to receive a data signal (also called "source signal"). The drain electrode of the pixel switching element T0 is connected with the pixel electrode. In the case where the voltage Vgs between the gate electrode and the source electrode of the pixel switching element T0 is less than the threshold voltage Vth, the pixel switching element T0 is turned off; in the case where the voltage Vgs between the gate electrode and the source electrode of the pixel switching element T0 is greater than the threshold voltage Vth, the pixel switching element T0 is turned on. Vgs=Vg−Vs, Vg represents the gate voltage of the pixel switching element T0, and Vs represents the source voltage of the pixel switching element T0.

In the process of displaying an image on the liquid crystal display panel, it is necessary to apply a voltage signal with changed polarity (positive and negative) to the liquid crystal molecules, so as to realize the AC driving of the liquid crystal molecules. However, this will easily result in the problem that the liquid crystal display panel is prone to uneven display, afterimage, etc., and even erroneous charging of negative polarity data.

One or more embodiments of the present disclosure provide a driving method to solve the problem that the liquid crystal display panel is prone to uneven display, afterimage, and even erroneous charging of negative polarity data, etc. After researching and analyzing the liquid crystal display panel, the inventor(s) of the present disclosure have found that the timing of the gate signal and the data signal causes the problem that the liquid crystal display panel is prone to uneven display, afterimage, and even erroneous charging of negative polarity data, etc., and accordingly proposed the present invention to solve this problem.

Figure 1D:
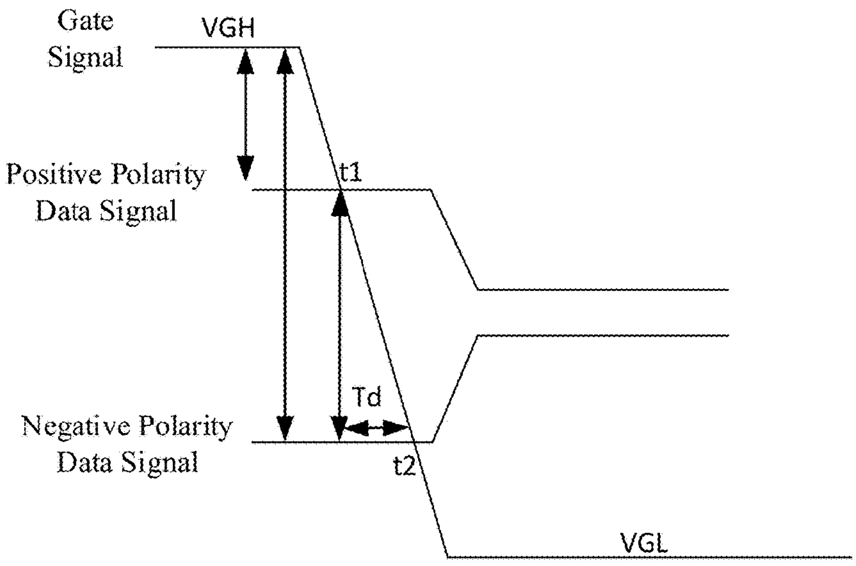
FIG. 1D is a partial timing chart of a gate signal and a data signal.

FIG. 1D is a partial timing chart of a gate signal and a data signal.

For example, the gate signal has a high level VGH equal to 36V and a low level VGL equal to −6V, that is, the gate voltage of the pixel switching element T0 can be VGH=36V or VGL=−6V. The Gamma voltage Vs+ of liquid crystal molecules with positive polarity ranges from 8.8V to 16.3V, and the Gamma voltage Vs− of liquid crystal molecules with negative polarity ranges from 0.3V to 7.8V. Gamma voltage is the source voltage of the pixel switching element T0. Therefore, in the case where the N-th image frame is negatively polarized, Vgs=36−(Vs−), and in the case where the (N+1)-th image frame is positively polarized, Vgs'=36−(Vs+). Because Vs− is less than Vs+, at the falling edge of the gate signal (in the process that the gate voltage changes from VGH to VGL), Vgs of the pixel switching element T0 in the case where the liquid crystal molecules are negatively polarized (hereinafter referred to as "negative polarity sub-pixel") is greater than Vgs' of the pixel switching element T0 in the case where the liquid crystal molecules are positively polarized (hereinafter referred to as "positive polarity sub-pixel"), that is, the off voltage position of the positive polarity sub-pixel is earlier than the off voltage position of the negative polarity sub-pixel, resulting in that the negative polarity sub-pixel has a longer charging time at the falling edge than the positive polarity sub-pixel.

In the present disclosure, a positive polarity data signal is a signal that makes the voltage of the pixel electrode of the sub-pixel higher than the voltage of the common electrode, and the negative polarity data signal makes the voltage of the pixel electrode of the sub-pixel lower than the voltage of the common electrode.

As shown in FIG. 1D, for example, the threshold voltage Vth=0. At the falling edge of the gate signal, that is, in the process that the gate voltage changes from VGH to VGL, if the data line provides a positive polarity data signal to the pixel switching element T0, then at the time point t1, Vgs' of the pixel switching element is equal to Vth=0; and if the data line provides a negative polarity data signal to the pixel switching element T0, then at the time point t2, Vgs of the pixel switching element is equal to Vth=0. Therefore, the time point when the positive polarity sub-pixel is turned off is earlier than the time point when the negative polarity sub-pixel is turned off by a delay time Td.

It should be noted that, in the above, the falling edge of the gate signal is taken as an example in FIG. 4 to illustrate that the charging time of the positive polarity is different from the charging time of the positive polarity, but this does not have a limiting effect on the embodiments to be described below in the present disclosure. For example, the driving method provided by the embodiments to be described below in the present disclosure can also be applied to the rising edge of the gate signal. Hereinafter, the falling edge and the rising edge of the gate signal are collectively referred to as transition periods. Moreover, the threshold voltage Vth=0 is merely an example, and in practical application, the threshold voltage can be any value.

During the transition period, the charging time of the negative polarity sub-pixel is longer than the charging time of the positive sub-pixel, and this will lead to the difference between charging times of different polarities, thus causing problems such as display defect (e.g., uneven display, afterimage), etc., and even erroneous charging of negative polarity data.

Figure 1E:
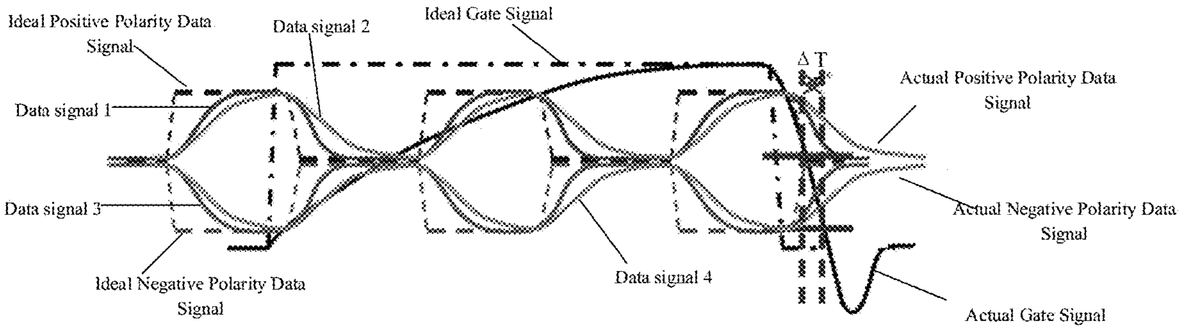
FIG. 1E is another partial timing chart of a gate signal and a data signal.

FIG. 1E is another partial timing chart of a gate signal and a data signal.

As shown in FIG. 1E, the ideal positive polarity data signal, the ideal negative polarity data signal and the ideal gate signal are all square wave signals (i.e., signals indicated by dashed lines). However, in practical application, whether it is the positive polarity data signal, the negative polarity data signal or the gate signal, there is a delay in the voltage change at the rising edge and falling edge, that is, it takes a certain time for the signal value to change from the first value to the second value. In FIG. 1E, the actual signals are represented by solid lines.

As shown in FIG. 1E, the actual positive polarity data signals includes data signal 1 and data signal 2. Data signal 1 represents the positive polarity data signal received by the sub-pixel close to the source driver chip; and data signal 2 represents the positive polarity data signal received by the sub-pixel away from the source driver chip. As shown in FIG. 1E, the positive polarity data signal received by the sub-pixel away from the source driver chip has a large delay relative to the positive polarity data signal received by the sub-pixel close to the source driver chip. Similarly, the actual negative polarity data signals include data signal 3 and data signal 4. Data signal 3 represents the negative polarity data signal received by the sub-pixel close to the source driver chip; and data signal 4 represents the negative polarity data signal received by the sub-pixel away from the source driver chip. As shown in FIG. 1E, the negative polarity data signal received by the sub-pixel away from the source driver chip has a large delay relative to the negative polarity data signal received by the sub-pixel close to the source driver chip.

For example, the falling edge of the actual gate signal is a slope. Due to the existence of the slope, the actual positive polarity data signal is turned off earlier than the actual negative polarity data signal, and the turning-off of the actual negative polarity data signal has a time delay ΔT relative to the turning-off of the actual positive polarity data signal.

For example, the resolution of the 16K liquid crystal display panel is 15360*RGB*8640, with a total of 15360*3=46080 columns of sub-pixels. The driver chip requires too many source channels (i.e., 46080 channels). The size of Chip On Flex or Chip On Film (COF) is developing towards a smaller and smaller design trend. The module bonding process limits the development of COF size. For example, the size of COF at the liquid crystal display panel end is too small, which easily exceeds the minimum size of bonding capacity, that is, when the position of equipment is adjusted after pre-alignment, the minimum step displacement distance has exceeded the size of COF, which leads to the inability to complete the bonding alignment. Taking the COFs of 960 display modules as an example, the number of COFs required for a single display module is 46,080/960=48, and the demand for a larger number of COFs leads to a decrease in the yield of bonding, and an increase of the cost.

Therefore, how to improve the picture quality and yield of the display panel and to ensure the quality while further reducing the cost is an urgent technical problem for those skilled in the art.

At least one embodiment of the present disclosure provides a driving method of a liquid crystal display panel and a liquid crystal display panel. The liquid crystal display panel includes a pixel array, the pixel array includes a plurality of gate lines, a plurality of data lines and a plurality of sub-pixels, the plurality of sub-pixels are arranged in a plurality of rows and a plurality of columns, each of the plurality of gate lines provides a gate signal for at least one row of sub-pixels, each of the plurality of data lines provides a data signal for at least one column of sub-pixels, and each sub-pixel is connected with a corresponding gate line and a corresponding data line. The driving method includes: providing a first gate signal to a first gate line corresponding to a first row of sub-pixels among the plurality of rows of sub-pixels, wherein the first gate signal includes an on period and an off period used to control the first row of sub-pixels to be turned on and off respectively; writing, during the on period of the first gate signal, a plurality of first data signals to sub-pixels among the first row of sub-pixels through the plurality of data lines, wherein the plurality of first data signals include a positive polarity data signal and a negative polarity data signal, and during the on period of the first gate signal, a first writing time length of the negative polarity data signal is less than a second writing time length of the positive polarity data signal. The driving method can improve the picture quality and yield of the liquid crystal display panel, and alleviate the problem that the liquid crystal display panel is prone to uneven display, afterimage, and even erroneous charging of negative polarity data, etc.

Figure 2A:
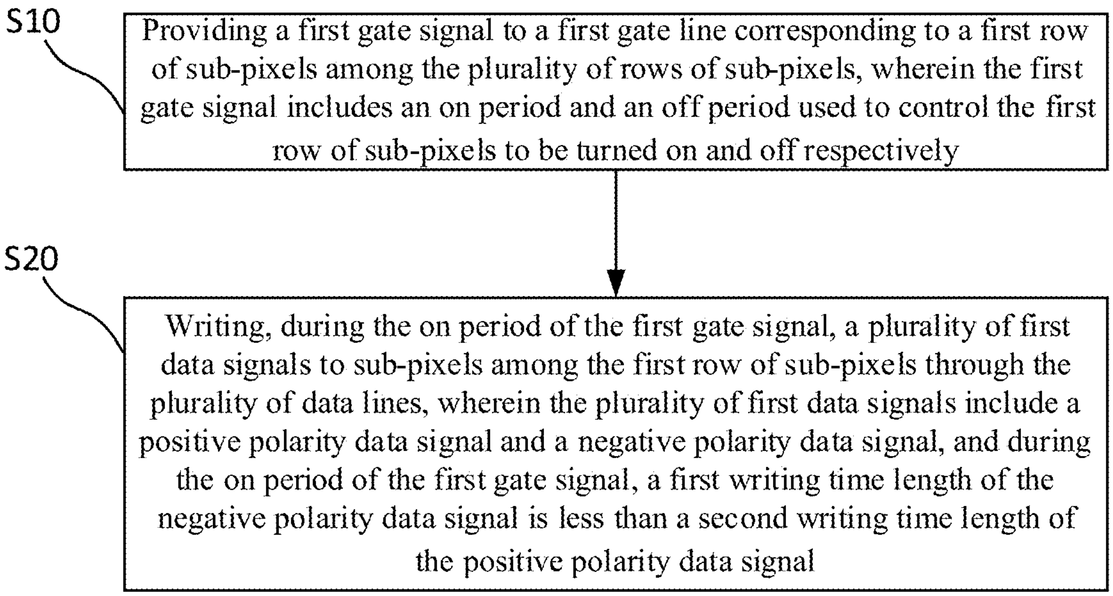
FIG. 2A is a flowchart of a driving method provided by at least one embodiment of the present disclosure.
Figure 2B:
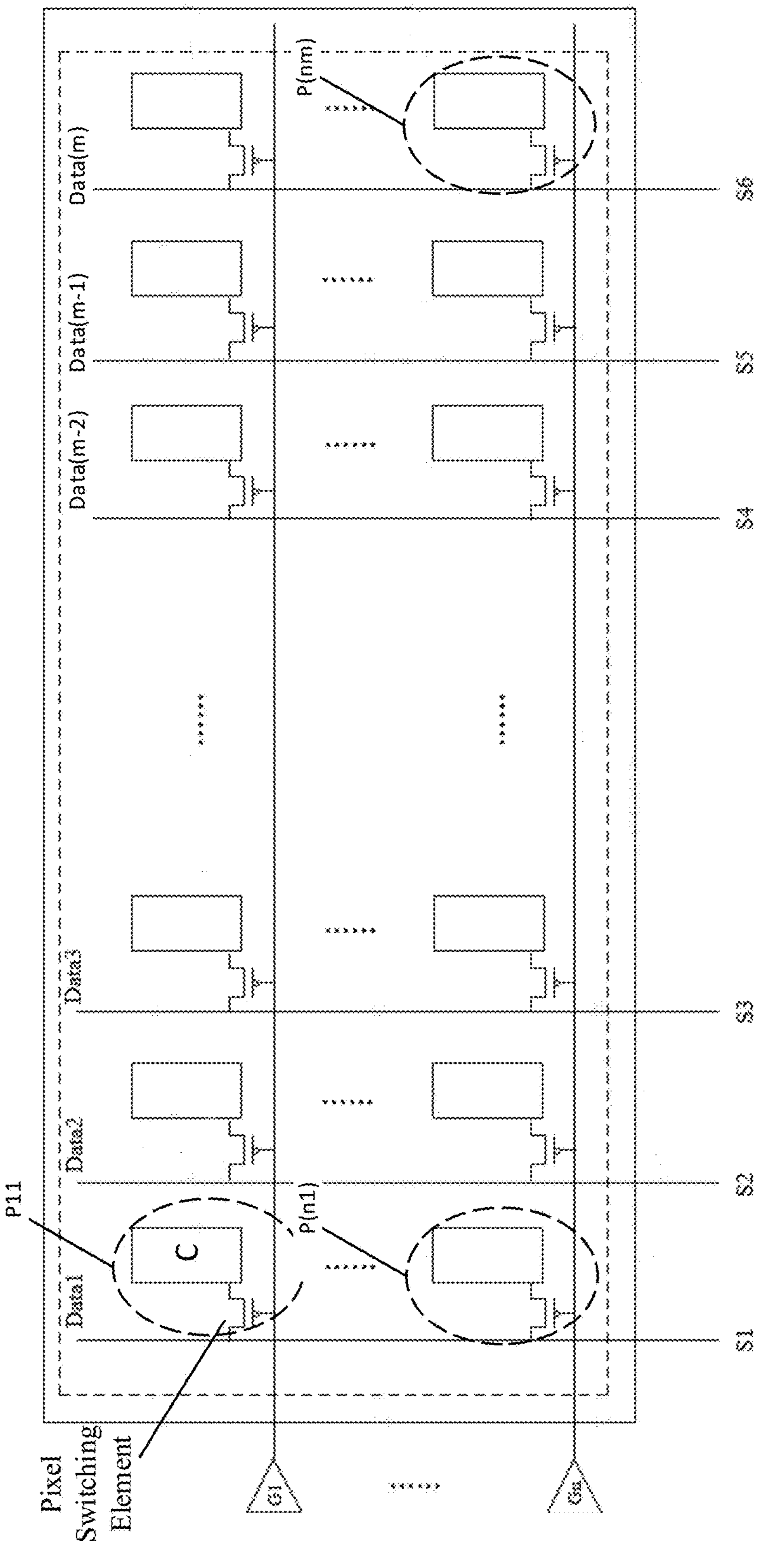
FIG. 2B is a schematic diagram of a pixel driving architecture of a liquid crystal display panel provided by at least one embodiment of the present disclosure.

FIG. 2A is a flowchart of a driving method provided by at least one embodiment of the present disclosure. FIG. 2B is a schematic diagram of a pixel driving architecture of a liquid crystal display panel provided by at least one embodiment of the present disclosure. The driving method shown in FIG. 2A can be applied to the pixel driving architecture.

As shown in FIG. 2A, the driving method can include steps S10-S20.

Step S10: Providing a first gate signal to a first gate line corresponding to a first row of sub-pixels among the plurality of rows of sub-pixels, wherein the first gate signal includes an on period and an off period used to control the first row of sub-pixels to be turned on and off respectively.

Step S20: Writing, during the on period of the first gate signal, a plurality of first data signals to sub-pixels among the first row of sub-pixels through the plurality of data lines, wherein the plurality of first data signals include a positive polarity data signal and a negative polarity data signal, and during the on period of the first gate signal, a first writing time length of the negative polarity data signal is less than a second writing time length of the positive polarity data signal.

As shown in FIG. 2B, the liquid crystal display panel includes a pixel array, the pixel array includes a plurality of gate lines (gate lines G1-Gn), a plurality of data lines (data lines Data1-Data(m)) and a plurality of sub-pixels (sub-pixels P11-P(nm)). The plurality of sub-pixels are arranged in a plurality of rows and a plurality of columns. For example, the sub-pixels P11-P(nm) are arranged in n rows and m columns, and n and m are integers greater than or equal to 1. Each sub-pixel can have the structure shown in FIG. 1A or FIG. 1B. For example, each sub-pixel includes a pixel switching element and an equivalent capacitor C, and the equivalent capacitor C can include, for example, a liquid crystal capacitor and a storage capacitor as shown in FIG. 1A or FIG. 1B.

Each gate line provides a gate signal for at least one row of sub-pixels, each data line provides a data signal for at least one column of sub-pixels, and each sub-pixel is connected with a corresponding gate line and a corresponding data line.

For step S10, the first row of sub-pixels refers to an optional row of sub-pixels in the pixel array, that is, "first" does not indicates an order in the present disclosure. Similarly, the first gate line refers to a gate line connected with first row of sub-pixels among the plurality of gate lines, and the first gate signal refers to a signal provided by the gate line connected with the first row of sub-pixels. For example, the first row of sub-pixels is the i-th row of sub-pixels in the pixel array, the first gate line is the gate line connected with the i-th row of sub-pixels in the pixel array, and i is an integer greater than or equal to 1.

The on period of the first gate signal is used to control the first row of sub-pixels to be turned on, and the off period of the first gate signal is used to control the first row of sub-pixels to be turned off. For example, the on period of the first gate signal can be a period during which the first gate signal is at a high level VGH, and the on period of the first gate signal can be a period during which the first gate signal is at a low level VGL.

For example, a gate signal is provided to the plurality of sub-pixels P(n1)-P(nm) arranged in the n-th row in the pixel array through the gate line Gn.

For step S20, for example, during the on period of the gate signal corresponding to the n-th row, the plurality of data lines write a plurality of first data signals to the plurality of sub-pixels P(n1)-P(nm), respectively. The plurality of first data signals include positive polarity data signals and negative polarity data signals. The plurality of sub-pixels Pn1-P(nm) arranged in the n-th row is an example of the first row of sub-pixels.

FIGS. 2C and 2D are schematic diagrams of a polarity inversion driving mode provided by at least one embodiment of the present disclosure.

FIG. 2C is a schematic diagram of polarity of the data signals of the N-th image frame, and FIG. 2D is a schematic diagram of polarity of the data signals of the (N+1)-th image frame.

As shown in FIG. 2C and FIG. 2D, the polarity inversion driving mode is a column inversion driving mode, that is, the polarities of data signals in the same column are the same, but the polarities of data signals in adjacent columns are opposite.

For the same sub-pixel, the polarity thereof in two adjacent frames changes.

As shown in FIG. 2C, for any row of sub-pixels in the N-th image frame, during the on period of this row of sub-pixels, the plurality of data lines write data signals to this row of sub-pixels, respectively. For example, negative polarity data signals are written to odd-numbered columns of sub-pixels, and positive polarity data signals are written to even-numbered columns of sub-pixels.

As shown in FIG. 2D, for any row of sub-pixels in the (N+1)-th image frame, during the on period of this row of sub-pixels, the plurality of data lines write data signals to this row of sub-pixels respectively. For example, positive polarity data signal are written to odd-numbered columns of sub-pixels, and negative polarity data signals are written to even-numbered columns of sub-pixels.

It should be noted that FIG. 2C and FIG. 2D are merely an example of a polarity inversion driving mode, which does not mean that the embodiment of the present disclosure is only applied to the polarity inversion driving mode shown in FIG. 2C and FIG. 2D. For example, the embodiment of the present disclosure can also be applied to the row inversion driving mode, that is, the polarities of data signals in the same row are the same, and the polarities of data signals in adjacent rows are opposite. For another example, the embodiment of the present disclosure can also be applied to the point inversion driving mode, that is, the polarities of the data signals of any adjacent sub-pixels are opposite.

For example, during the on period of the first gate signal, the writing time length of the negative polarity data signal is T−, and the writing time length of the positive polarity data signal is T+, and $0<T-<T+$. T− is an example of the first writing time length, and T+ is an example of the second writing time length. In the present embodiment, by adjusting the writing time length of the negative polarity data signal to be less than the writing time length of the positive polarity data signal during the on period of the first gate signal, the influence caused by the fact that the charging time of the negative polarity data signal is longer than the charging time of the positive polarity data signal during the transition period is compensated, thereby alleviating the problems of uneven display, afterimage, and even erroneous charging of negative polarity data, etc. The present embodiment only needs to adjust the timing relationship between the negative polarity data signal or the positive polarity data signal and the first gate signal to realize, and does not need to change the hardware circuit of the liquid crystal display panel, which is easy to be implemented and has good compatibility.

In some embodiments of the present disclosure, a delay time of the negative polarity data signal relative to a starting time point of the on period corresponding to the first gate signal is a first time length, a delay time of the positive polarity data signal relative to the starting time point of the on period corresponding to the first gate signal is a second time length, and the first time length is greater than the second time length, so that the first writing time length of the negative polarity data signal is less than the second writing time length of the positive polarity data signal during the on period of the first gate signal.

Figure 2E:
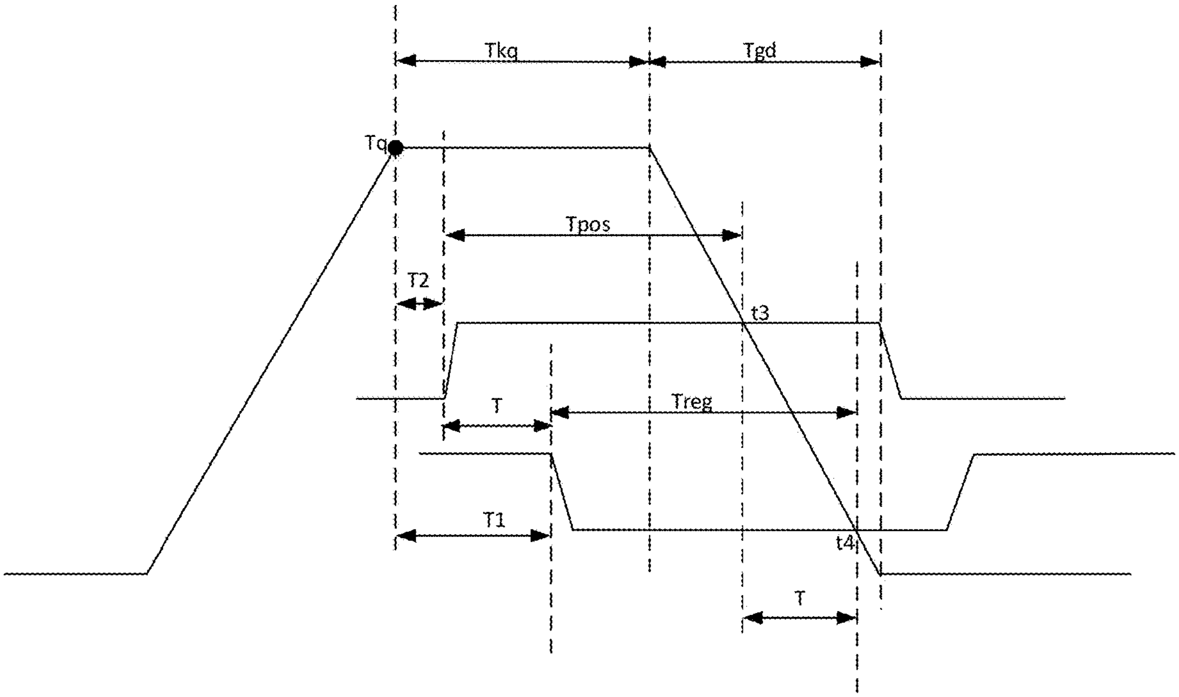
FIG. 2E is a timing signal chart of a gate signal and a data signal provided by at least one embodiment of the present disclosure.

FIG. 2E is a timing signal chart of a gate signal and a data signal provided by at least one embodiment of the present disclosure.

In some embodiments of the present disclosure, the on period corresponding to the first gate signal can refer to, for example, a period in which the gate voltage of the first gate signal is VGH, and the starting time point of the on period corresponding to the first gate signal refers to the time point when the gate voltage starts to be VGH. As shown in FIG. 2E, the on period corresponding to the first gate signal can be Tkq, and the starting time point of the on period corresponding to the first gate signal can be time point Tq.

In some other embodiments of the present disclosure, for example, the time point when the gate-source voltage Vgs' is equal to the threshold voltage Vth in the case where the first data line provides the positive polarity data signal is taken as the starting time point of the on period corresponding to the first gate signal. For example, in the present embodiment, the starting time point of the on period corresponding to the first gate signal is slightly earlier than the time point Tq.

Hereinafter, unless otherwise specified, at least some embodiments of the present disclosure will be described with the starting time point as the time point Tq.

As shown in FIG. 2E, the delay time of the negative polarity data signal relative to the starting time point Tq is a first time length T1, and the delay time of the positive polarity data signal relative to the starting time point Tq is a second time length T2. The first time length T1 is greater than the second time length T2. In the present embodiment, by providing the negative polarity data signal later than the positive polarity data signal, the influence caused by the fact that the charging time of the negative polarity data signal is longer than the charging time of the positive polarity data signal is compensated, thereby alleviating the problems of uneven display, afterimage, and even erroneous charging of negative polarity data, etc.

In some embodiments of the present disclosure, the second time length T2 can be, for example, approximately equal to 0. The first time length can be determined according to the difference between the charging time length of the negative polarity data signal and the charging time length of the positive polarity data signal and the second time length T2.

In some embodiments of the present disclosure, the first gate signal includes a transition period between the on period and the off period adjacent to each other. The first time length is greater than the second time length by a preset time length, and the preset time length is a difference between the writing time length of the negative polarity data signal and the writing time length of the positive polarity data signal during the transition period of the first gate signal.

For example, the transition period is the period of the falling edge of the first gate signal, and in FIG. 2E, the transition period Tgd is the falling edge between the on period and the off period adjacent to each other.

As shown in FIG. 2E, for example, the threshold voltage Vth is equal to 0; during the transition period Tgd, for the negative polarity data signal, Vgs of the thin film transistor at the time point t4 is equal to Vth (Vgs=Vth=0), and at this time, the negative polarity data signal stops being written; and for the positive polarity data signal, Vgs' of the thin film transistor at the time point t3 is equal to Vth (Vgs'=Vth=0), and at this time, the positive polarity data signal stops being written. Therefore, the writing time length of the negative polarity data signal is Treg, and the writing time length of the positive polarity data signal is Tpos. The preset time length T is equal to Treg−Tpos (T=Treg−Tpos), so the first time length T1 is greater than the second time length T2 by the preset time length T.

In some other embodiments of the present disclosure, considering that the first gate signal further includes a rising edge, because the rising edge causes the time point when the negative polarity data signal is written into the sub-pixel to be earlier than the time point when the positive polarity data signal is written into the sub-pixel, the preset time length can be slightly greater than T. For example, at the rising edge, the time point when the negative polarity data signal is written into the sub-pixel is earlier than the time point when the positive polarity data signal is written into the sub-pixel by t, and the preset time length can be T+t.

For another example, in the embodiment in which the time point when the gate-source voltage Vgs' is equal to the threshold voltage Vth is taken as the starting time point of the on period corresponding to the first gate signal in the case where the data line provides the positive polarity data signal, the first time length T1 is greater than the second time length T2 by the preset time length T.

In some embodiments of the present disclosure, the starting time point of the on period corresponding to the first gate signal relative to the negative polarity data signal and the starting time point of the on period corresponding to the first gate signal relative to the positive polarity data signal are the same or different.

For example, in the example shown in FIG. 2E, the starting time point of the on period corresponding to the first gate signal relative to the negative polarity data signal and the starting time point of the on period corresponding to the first gate signal relative to the positive polarity data signal are both the time point Tq.

For another example, the starting time point of the on period corresponding to the first gate signal relative to the negative polarity data signal is the time point when the gate voltage starts to be VGH in the k-th cycle of the first gate signal, the starting time point of the on period corresponding to the first gate signal relative to the positive polarity data signal is the time point when the gate voltage starts to be VGH in the r-th cycle, and k and r are different integers. For example, the k-th cycle and the r-th cycle are adjacent cycles, that is, in the k-th cycle of the first gate signal, negative polarity data signals are provided to the odd-numbered rows in FIG. 2C, and in the r-th cycle of the first gate signal, positive polarity data signals are provided to the even-numbered rows in FIG. 2C.

Figure 3A:
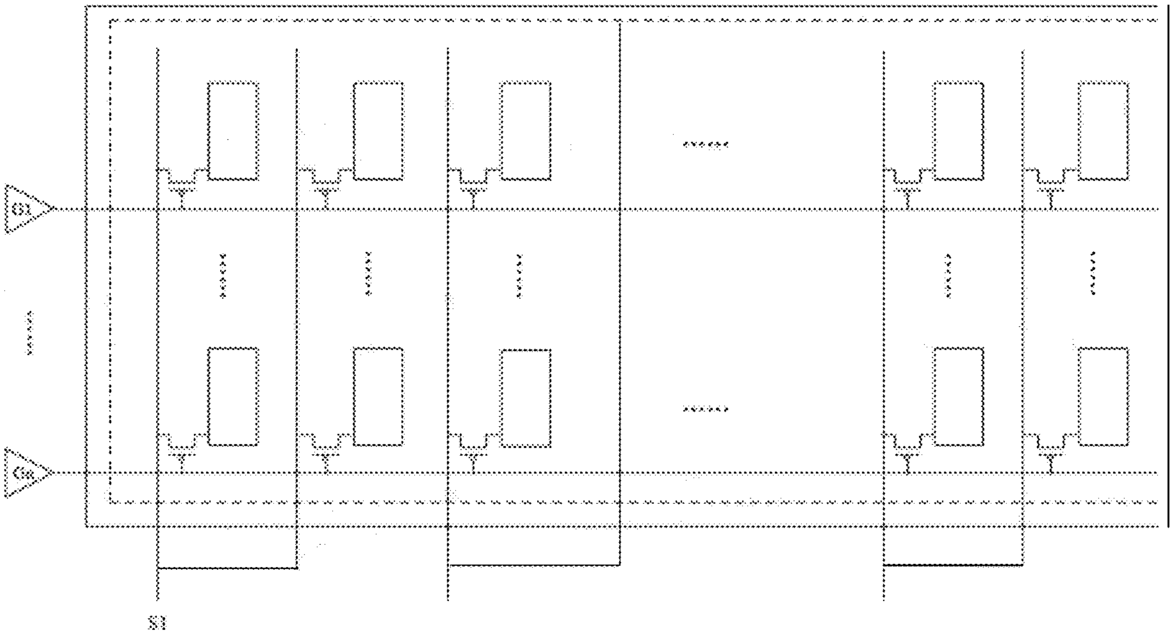
FIG. 3A is a schematic diagram of another pixel driving architecture of a liquid crystal display panel applying a driving method provided by at least one embodiment of the present disclosure.
Figure 3B:
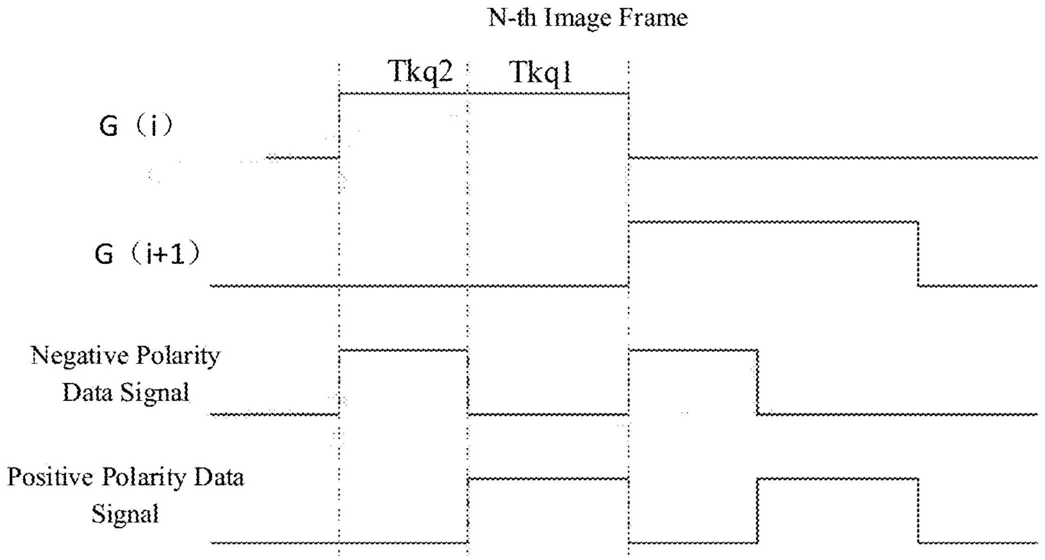
FIGS. 3B and 3C are timing signal charts provided by at least one embodiment of the present disclosure.
Figure 3C:
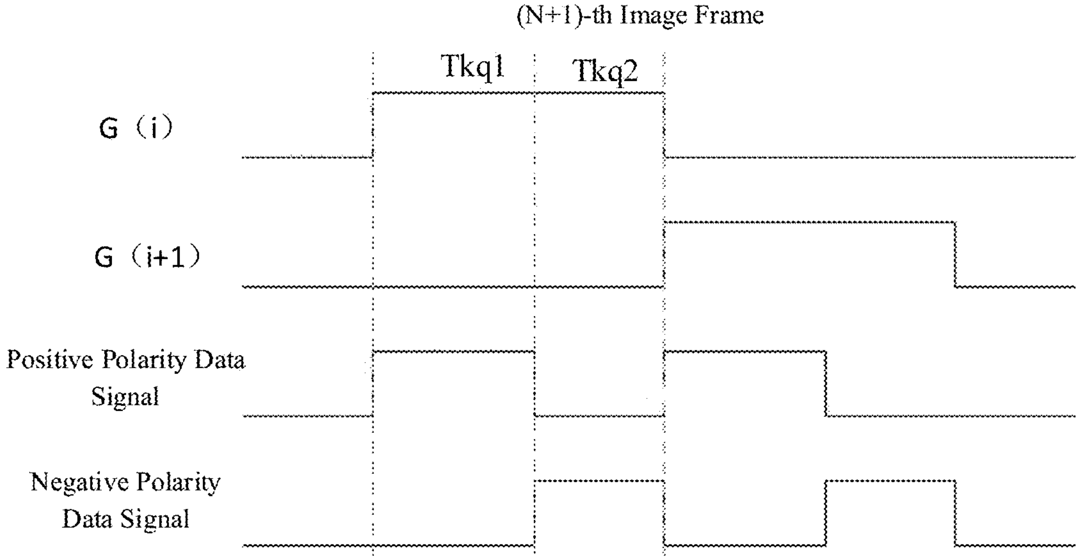

FIG. 3A is a schematic diagram of another pixel driving architecture of a liquid crystal display panel applying a driving method provided by at least one embodiment of the present disclosure. FIGS. 3B and 3C are timing signal charts provided by at least one embodiment of the present disclosure.

As shown in FIG. 3A, in this driving architecture, each data line provides data signals for two adjacent columns of sub-pixels. For example, the data line S1 provides data signals for, for example, adjacent first and second columns of sub-pixels arranged in the pixel array. In this driving architecture, except that each data line provides data signals for two adjacent columns of sub-pixels, the rest structures are similar to those shown in FIG. 2B, and reference can be made to the description of FIG. 2B.

In an example of this driving architecture, each data line provides a positive polarity data signal and a negative polarity data signal for a first sub-pixel and a second sub-pixel located in a same row and in two adjacent columns, respectively. For example, at a first time point during the on period of the first gate signal, each data line provides a positive polarity data signal and a negative polarity data signal for the first sub-pixel and the second sub-pixel in two adjacent columns among the first row of sub-pixels, respectively. The on period of the first gate signal includes a first sub-on period and a second sub-on period. The positive polarity data signal is applied to the first sub-pixel during the first sub-on period, the negative polarity data signal is applied to the second sub-pixel during the second sub-on period, and the time length of the first sub-on period is greater than the time length of the second sub-on period. For another example, at a second time point during the on period of the first gate signal, each data line provides a negative polarity data signal and a positive polarity data signal for the first sub-pixel and the second sub-pixel in two adjacent columns among the first row of sub-pixels, respectively.

In the example of FIG. 3B, the polarity distribution of liquid crystal molecules in the N-th image frame is, for example, as shown in the example of FIG. 2C. For the i-th row of sub-pixels in the pixel array (an example of the first row of sub-pixel), during the on period of the first gate signal G(i) provided for the first row of sub-pixels (i.e., during the period in which the gate signal G(i) is at a high level), each data line sequentially provides a negative polarity data signal and a positive polarity data signal to the first sub-pixel and the second sub-pixel in the first row and in adjacent columns, respectively. For example, the plurality of data lines firstly provide negative polarity data signals to odd-numbered rows of sub-pixels, and then provide positive polarity data signals to even-numbered rows of sub-pixels, and the time length for providing negative polarity data signals to odd-numbered rows of sub-pixels is shorter than the time length for providing positive polarity data signals to even-numbered rows of sub-pixels.

As shown in FIG. 3B, the on period of the first gate signal G(i) includes a first sub-on period Tkq1 and a second sub-on period Tkq2. The time length of the first sub-on period Tkq1 is greater than the time length of the second sub-on period Tkq2. During the second sub-on period Tkq2, the plurality of data lines provide negative polarity data signals to odd-numbered rows of sub-pixels, respectively, and during the first sub-on period Tkq1, the plurality of data lines provide positive polarity data signals to even-numbered rows of sub-pixels, respectively. In the example of FIG. 3B, for example, the second sub-on period Tkq2 is earlier than the first sub-on period Tkq1. In some other embodiments, the second sub-on period Tkq2 can also be later than the first sub-on period Tkq1.

After the first row of sub-pixels is turned off, a second row of sub-pixels is turned on. The second row of sub-pixel can be, for example, sub-pixels in a row adjacent to or not adjacent to the first row of sub-pixels. For example, during the on period of the second gate signal G(i+1) for the second row of sub-pixels, the second row of sub-pixels is turned on, so that the plurality of data lines provide negative polarity data signals and positive polarity data signals to the second row of sub-pixels, respectively. The plurality of data lines respectively provide negative polarity data signals and positive polarity data signals to the second row of sub-pixels in the same manner as the plurality of data lines respectively provide negative polarity data signals and positive polarity data signals to the first row of sub-pixels, and details are not repeated here.

For example, FIG. 3C is a timing signal chart of the (N+1)-th image frame. For example, the polarity distribution of liquid crystal molecules in the (N+1)-th image frame is as shown in the example of FIG. 2D. For the i-th row of sub-pixels in the pixel array (an example of the first row of sub-pixel), during the on period of the gate signal G(i) provided for the first row of sub-pixels (i.e., during the period in which the gate signal G(i) is at a high level), each data line sequentially provides a positive polarity data signal and a negative polarity data signal to the first sub-pixel and the second sub-pixel in the first row and in adjacent columns, respectively. For example, the plurality of data lines firstly provide positive polarity data signals to odd-numbered rows of sub-pixels, and then provide negative polarity data signals to even-numbered rows of sub-pixels.

The on period of the first gate signal includes a first sub-on period Tkq1 and a second sub-on period Tkq2. The time length of the first sub-on period Tkq1 is greater than the time length of the second sub-on period Tkq2. During the first sub-on period Tkq1, the plurality of data lines provide positive polarity data signals to odd-numbered rows of sub-pixels, respectively, and during the second sub-on period Tkq2, the plurality of data lines provide negative polarity data signals to even-numbered rows of sub-pixels, respectively. In the example of FIG. 3C, for example, the second sub-on period Tkq2 is later than the first sub-on period Tkq1. In some other embodiments, the second sub-on period Tkq2 can also be earlier than the first sub-on period Tkq1.

Similarly, after the first row of sub-pixels is turned off, the second row of sub-pixels is turned on. The second row of sub-pixel can be, for example, sub-pixels in a row adjacent to or not adjacent to the first row of sub-pixels. For example, during the on period of the second gate signal G(i+1) for the second row of sub-pixels, the second row of sub-pixels is turned on, so that the plurality of data lines provide negative polarity data signals and positive polarity data signals to the second row of sub-pixels, respectively.

The pixel driving architecture provides data signals to two sub-pixels in adjacent columns (i.e., 1:2 control) through a data line, which can reduce the number of COF used, improve the bonding yield in a disguised form, and reduce the cost; and the driving architecture makes it easier to realize the control of the first writing time length and the second writing time length.

Figure 4:
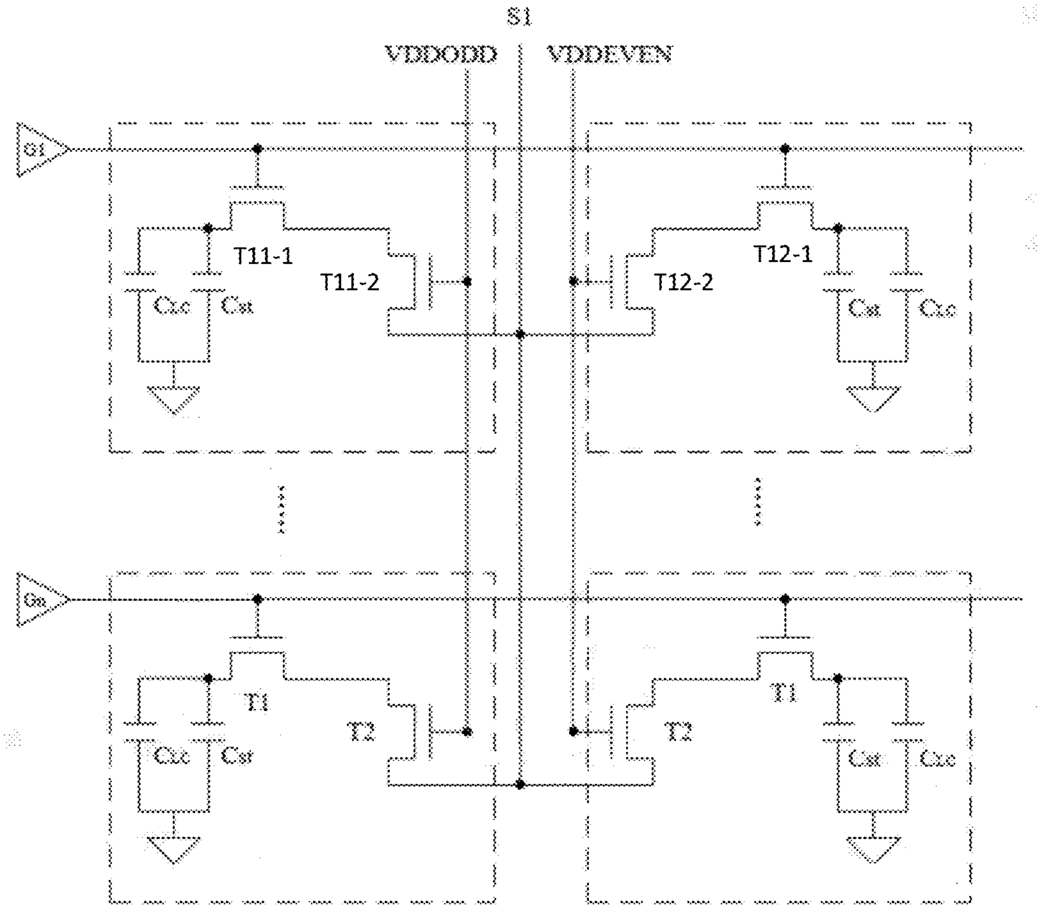
FIG. 4 is a schematic diagram of part of another pixel driving architecture of a liquid crystal display panel applying a driving method provided by at least one embodiment of the present disclosure.

FIG. 4 is a schematic diagram of part of another pixel driving architecture of a liquid crystal display panel applying a driving method provided by at least one embodiment of the present disclosure.

As shown in FIG. 4, each sub-pixel in a liquid crystal display panel includes a pixel electrode and a pixel switching element. For the description of the pixel electrode and the pixel switching element, please refer to FIGS. 1A and 1B, but it is not limited to the cases shown in FIGS. 1A and 1B.

In the present example, each data line provides data signals for two adjacent columns of sub-pixels. For example, the data line S1 provides data signals for a first column of sub-pixels and a second column of sub-pixels. The first column of sub-pixels refers to an optional column of sub-pixels in the pixel array, and the second column of sub-pixels is adjacent to the first column of sub-pixels. For example, the first column of sub-pixels is the column in which the sub-pixel Q11 is located, and the second column of sub-pixels is the column in which the sub-pixel Q12 is located.

It should be noted that although only the connection relationship between the data line S1 and the two columns of sub-pixels is shown in FIG. 4, it does not mean that the pixel driving architecture only includes the data line S1 and the two columns of sub-pixels. In fact, the pixel driving architecture usually includes a plurality of data lines and a plurality of columns of sub-pixels, and the arrangement of other data lines and other columns of sub-pixels is similar to that shown in FIG. 4, and details are not repeated here.

As shown in FIG. 4, each sub-pixel can include a multiplexing toggle switching element in addition to the pixel switching element. For example, the sub-pixel Q11 includes a pixel switching element T11-1 and a multiplexing toggle switching element T11-2, and the sub-pixel Q12 includes a pixel switching element T12-1 and a multiplexing toggle switching element T12-2.

Each data line provides the positive polarity data signal to the pixel electrode of the first sub-pixel through a first multiplexing toggle switching element, and provides the negative polarity data signal to the pixel electrode of the second sub-pixel through a second multiplexing toggle switching element.

For example, when the liquid crystal molecules of the sub-pixel Q11 are positively polarized, the data line S1 provides the positive polarity data signal to the source electrode of the pixel switching element T11-1 of the sub-pixel Q11 through the multiplexing toggle switching element T11-2, thereby providing the positive polarity data signal to the pixel electrode of the sub-pixel Q11. When the liquid crystal molecules of the sub-pixel Q12 are negatively polarized, the data line S1 provides the negative polarity data signal to the source electrode of the pixel switching element T12-1 of the sub-pixel Q12 through the multiplexing toggle switching element T12-2, thereby providing the negative polarity data signal to the pixel electrode of the sub-pixel Q12. The multiplexing toggle switching element T11-2 and the multiplexing toggle switching element T12-2 are examples of the first multiplexing toggle switching element and the second multiplexing toggle switching element, respectively. In some embodiments of the present disclosure, the other switching element in the sub-pixel can be, for example, a thin film transistor, or a switching element of other types. For example, the first multiplexing toggle switching element, the second multiplexing toggle switching element and the pixel switching element are all thin film transistors.

As shown in FIG. 4, the multiplexing toggle switching element T11-2 is connected with a control line VDDODD to receive a first control signal provided by the control line VDDODD, and the multiplexing toggle switching element T11-2 is configured to be turned on and off in response to the control of the first control signal. The multiplexing toggle switching element T12-2 is connected with a control line VDDEVEN to receive a second control signal provided by the control line VDDEVEN, and the multiplexing toggle switching element T12-2 is configured to be turned on and off in response to the control of the second control signal.

For example, when the data line S1 provides a positive polarity data signal, the first control signal provided by the control line VDDODD turns on the multiplexing toggle switching element T11-2, so that the positive polarity data signal is provided to the pixel electrode of the pixel switching element T11-1; and the second control signal provided by the control line VDDEVEN turns off the multiplexing toggle switching element T12-2, so that the positive polarity data signal cannot be provided to the pixel electrode of the pixel switching element T12-1.

For example, when the data line S1 provides a negative polarity data signal, the first control signal provided by the control line VDDODD turns off the multiplexing toggle switching element T11-2, so that the negative polarity data signal cannot be provided to the pixel electrode of the pixel switching element T11-1; and the second control signal provided by the control line VDDEVEN turns on the multiplexing toggle switching element T12-2, so that the negative polarity data signal is provided to the pixel electrode of the pixel switching element T12-1.

It should be noted that the above embodiments of the present disclosure only take the data line S1, the sub-pixel P11 and the sub-pixel P12 as an example to illustrate the embodiments provided by the present disclosure, which has no limitation on the present disclosure; other data lines and other sub-pixels in the pixel array are subjected to a driving method similar to that of the data line S1, the sub-pixel P11 and the sub-pixel P12, and details are not repeated here.

For another example, in the case where the liquid crystal molecules in the sub-pixel Q11 are negatively polarized and the liquid crystal molecules in the sub-pixel Q12 are positively polarized in a certain image frame, when the data line S1 provides the negative polarity signal, the multiplexing toggle switching element T11-2 is turned on, and when the data line S1 provides the positive polarity signal, the multiplexing toggle switching element T12-2 is turned off.

In the present embodiment, by using the first multiplexing toggle switching element and the second multiplexing toggle switching element, it can be realized whether to write data signals to the sub-pixels during the first sub-on period and the second sub-on period, so as to realize the AC driving of liquid crystal molecules; and by adjusting the time ratio of the second sub-on period Tkq2 to the first sub-on period Tkq1, the second sub-on period Tkq2 (negative polarity charging time length) can be reduced and the first sub-on period Tkq1 (positive polarity charging time length) can be increased, so as to adjust the positive and negative charging time to make the pixel voltage achieve a balance between positive and negative polarity, thereby improving the uniformity of the display panel and enhancing the picture quality.

The first sub-on period and the second sub-on period are the same as the on period of the first multiplexing toggle switching element and the on period of the second multiplexing toggle switching element, respectively. For example, during the sub-on period Tkq1, the multiplexing toggle switching element T11-2 is turned on; and during the sub-on period Tkq2, the multiplexing toggle switching element T12-2 is turned on.

Figure 5A:
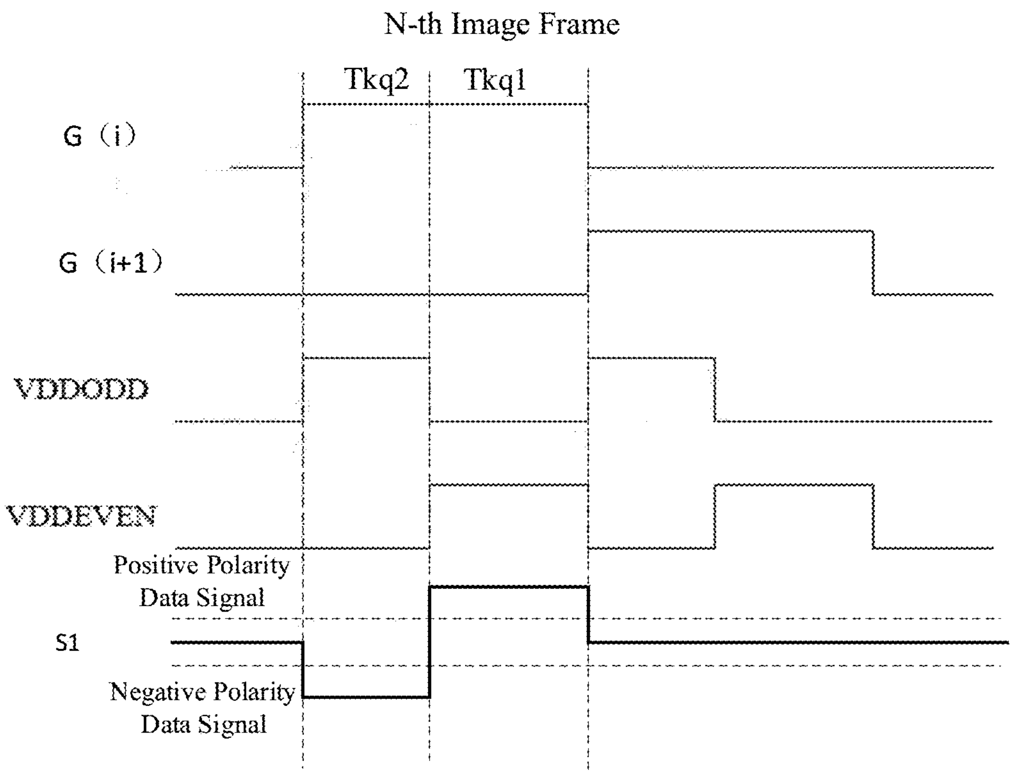
FIG. 5A is a timing signal chart of an N-th image frame provided by at least one embodiment of the present disclosure.
Figure 5B:
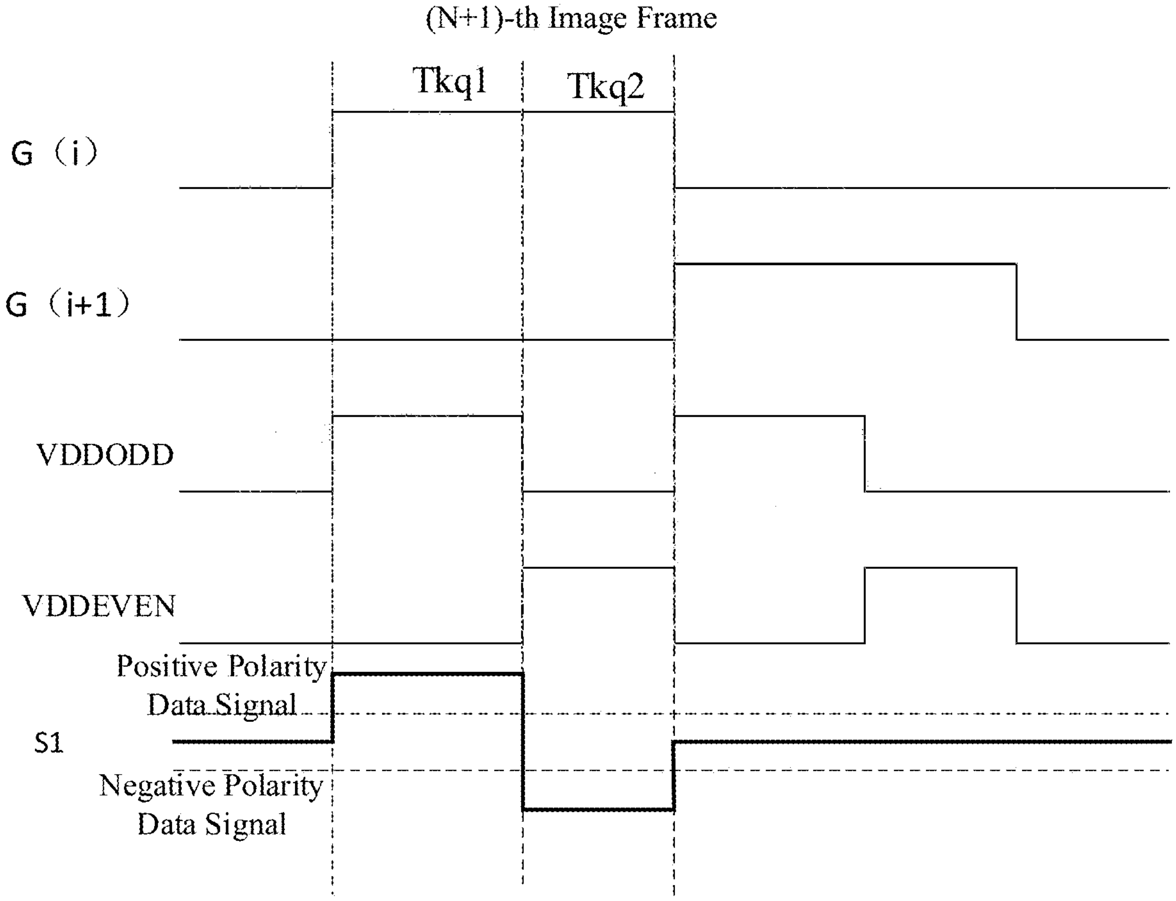
FIG. 5B is a timing signal chart of an (N+1)-th image frame provided by at least one embodiment of the present disclosure.

FIG. 5A is a timing signal chart of an N-th image frame provided by at least one embodiment of the present disclosure; and FIG. 5B is a timing signal chart of an (N+1)-th image frame provided by at least one embodiment of the present disclosure.

As shown in FIG. 5A, for the N-th image frame, the gate signals of the plurality of rows of sub-pixels are in an on state sequentially. For example, when the first gate signal G(i) of the first row of sub-pixels is turned on, the liquid crystal molecules of the odd-numbered columns of sub-pixels are negatively polarized, and the liquid crystal molecules of the even-numbered columns of sub-pixels are positively polarized. The data lines connected with adjacent columns sequentially provides negative polarity data signals to the odd-numbered columns of sub-pixels and positive polarity data signals to the even-numbered columns of sub-pixels. That is, the polarity distribution of data signals of the N-th image frame is as shown in FIG. 2C.

As shown in FIG. 5A, the sub-on period Tkq1 is the same as the on period of the multiplexing toggle switching elements in even-numbered columns (i.e., the period in which the VDDEVEN signal is at a high level), and the sub-on period Tkq2 is the same as the on period of the multiplexing toggle switching elements in odd-numbered columns (i.e., the period in which the VDDODD signal is at a high level).

As shown in FIG. 5B, for the (N+1)-th image frame, the gate signals of the plurality of rows of sub-pixels are in an on state sequentially. For example, when the first gate signal G(i) of the first row of sub-pixels is turned on, the liquid crystal molecules of the odd-numbered columns of sub-pixels are positively polarized, and the liquid crystal molecules of the even-numbered columns of sub-pixels are negatively polarized. The data lines connected with adjacent columns sequentially provides positive polarity data signals to the odd-numbered columns of sub-pixels and negative polarity data signals to the even-numbered columns of sub-pixels. That is, the polarity distribution of data signals of the (N+1)-th image frame is as shown in FIG. 2D.

As shown in FIG. 5B, the sub-on period Tkq1 is the same as the on period of the multiplexing toggle switching elements in odd-numbered columns (i.e., the period in which the VDDODD signal is at a high level), and the sub-on period Tkq2 is the same as the on period of the multiplexing toggle switching elements in even-numbered columns (i.e., the period in which the VDDEVEN signal is at a high level).

Figure 6:
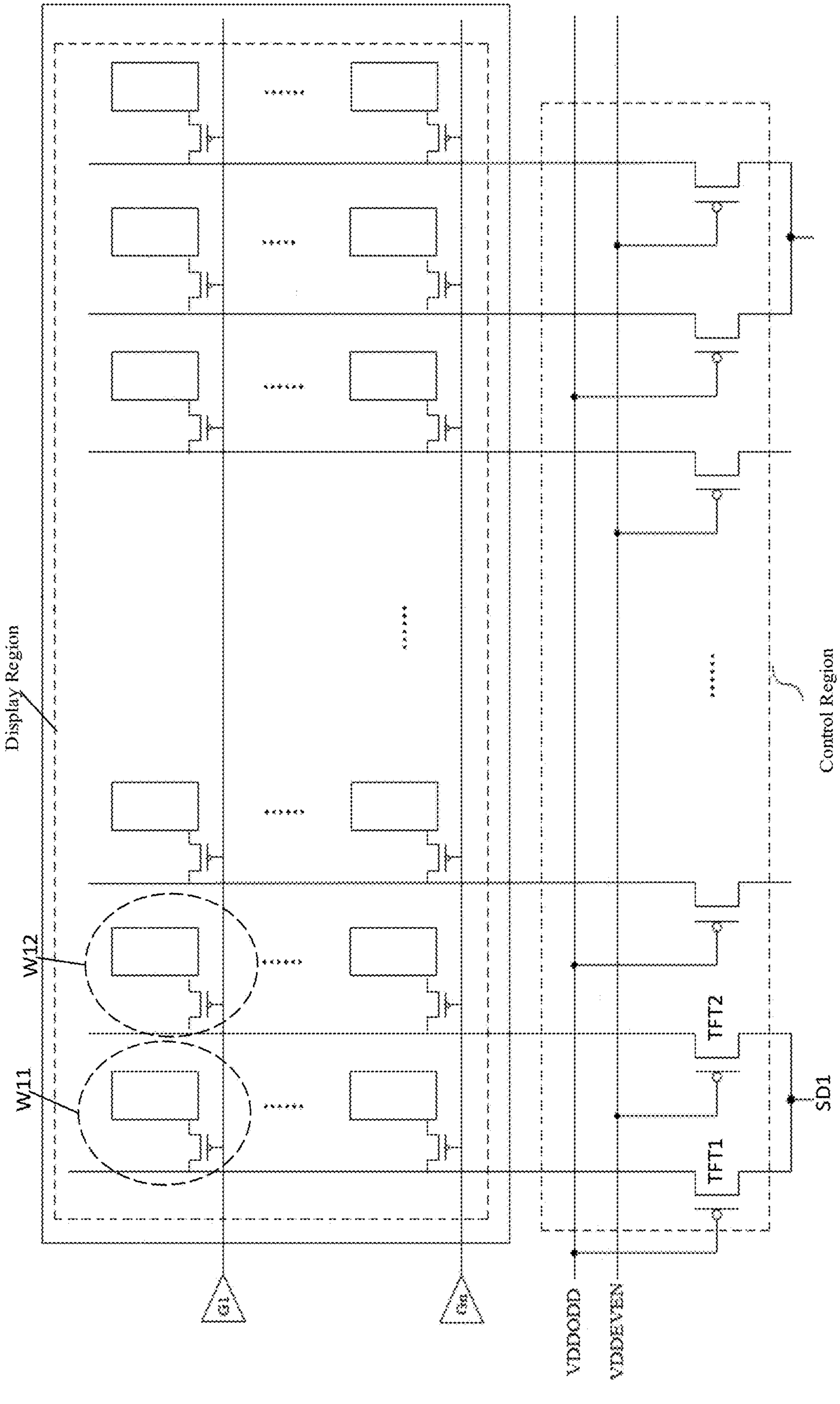
FIG. 6 is a schematic diagram of another pixel driving architecture of a liquid crystal display panel applying a driving method provided by at least one embodiment of the present disclosure.

FIG. 6 is a schematic diagram of another pixel driving architecture of a liquid crystal display panel applying a driving method provided by at least one embodiment of the present disclosure.

As shown in FIG. 6, the first multiplexing toggle switching element and the second multiplexing toggle switching element are disposed at a periphery of the liquid crystal display panel. The periphery of the liquid crystal display panel is, for example, a control region of the liquid crystal display panel. The plurality of sub-pixels are disposed in the display region of the liquid crystal display panel. For example, the multiplexing toggle switching element TFT1 and the multiplexing toggle switching element TFT2 are arranged in the control region at the periphery of the liquid crystal display panel. The multiplexing toggle switching element TFT1 and the multiplexing toggle switching element TFT2 are examples of the first multiplexing toggle switching element and the second multiplexing toggle switching element, respectively. For example, at a first time point, the data line SD1 provides a positive polarity data signal and a negative polarity data signal to the sub-pixel W11 and the sub-pixel W12 through the multiplexing toggle switching element TFT1 and the multiplexing toggle switching element TFT2 respectively, or at a second time point, the data line SD1 provides a negative polarity data signal and a positive polarity data signal to the sub-pixel W11 and the sub-pixel W12 through the multiplexing toggle switching element TFT1 and the multiplexing toggle switching element TFT2, respectively. The sub-pixel W11 and the sub-pixel W12 are examples of the first sub-pixel and the second sub-pixel, respectively.

As shown in FIG. 6, one column of sub-pixels in which the sub-pixel W11 is located share the multiplexing toggle switching element TFT1, and one column of sub-pixels in which the sub-pixel W12 is located share the multiplexing toggle switching element TFT2.

The other data lines in the liquid crystal display panel are connected with two adjacent sub-pixels in the same manner as the data line S1 is connected with the sub-pixels P11 and P12, and details are not repeated here. The structure of each sub-pixel is similar to the structure of the sub-pixel in the foregoing embodiments, and details are not repeated here.

In the present embodiment, the first multiplexing toggle switching element and the second multiplexing toggle switching element which are controlled by the voltages provided by the VDDODD signal line and the VDDEVEN signal line are added, and the first multiplexing toggle switching element and the second multiplexing toggle switching element are disposed in the control region, so that the usage number of the first multiplexing toggle switching elements and the usage number of the second multiplexing toggle switching elements are reduced; and the multiplexing toggle switching elements are disposed in the control region instead of the display region, so that the influence of adding the switching elements on the pixel aperture ratio can be further eliminated.

Figure 7:
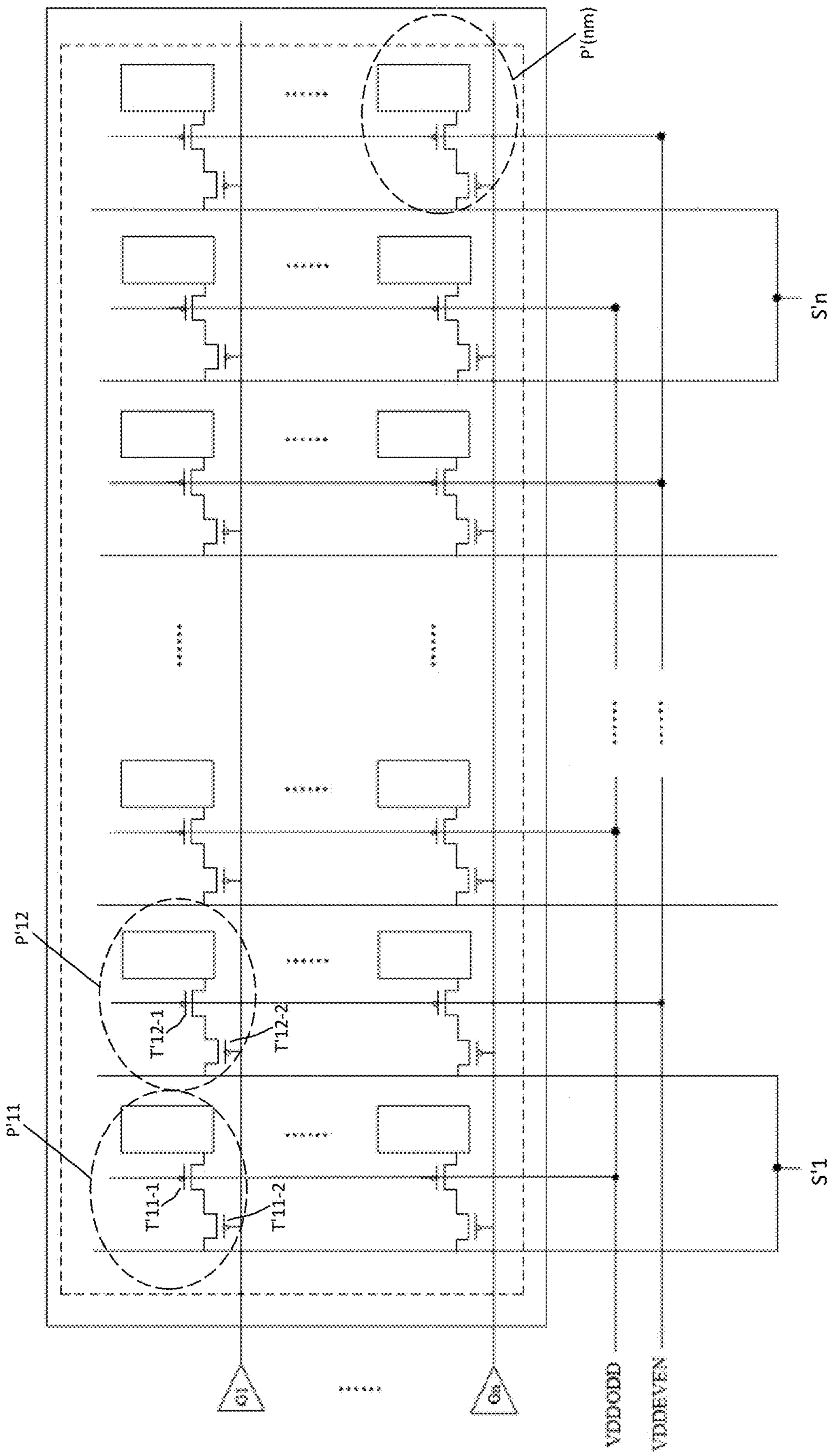
FIG. 7 is a schematic diagram of another pixel driving architecture of a liquid crystal display panel applying a driving method provided by at least one embodiment of the present disclosure.

FIG. 7 is a schematic diagram of another pixel driving architecture of a liquid crystal display panel applying a driving method provided by at least one embodiment of the present disclosure.

For example, the pixel driving architecture includes a plurality of sub-pixels P'11, P'12, . . . , P'(nm), and each data line provides a positive polarity data signal and a negative polarity data signal for a first sub-pixel and a second sub-pixel located in a same row and in two adjacent columns, respectively. For example, in a certain image frame, the data line S'1 provides a positive polarity data signal and a negative polarity data signal for the sub-pixel P'11 and the sub-pixel P'12, respectively. The sub-pixel P'11 and the sub-pixel P'12 are examples of the first sub-pixel and the second sub-pixel, respectively.

As shown in FIG. 7, each sub-pixel can include a multiplexing toggle switching element. For example, the sub-pixel P'11 includes a multiplexing toggle switching element T'11-1 and the sub-pixel P'12 includes a multiplexing toggle switching element T'12-1.

In the example of FIG. 7, the structure of each sub-pixel is the same as the structure of the foregoing embodiments (e.g., FIGS. 1A and 1B) except that a multiplexing toggle switching element is added in each sub-pixel, and details are not repeated here. For example, the multiplexing toggle switching element is placed between the pixel switching element and the pixel electrode.

Each data line provides the positive polarity data signal to the pixel electrode of the first sub-pixel through a first multiplexing toggle switching element, and provides the negative polarity data signal to the pixel electrode of the second sub-pixel through a second multiplexing toggle switching element. The multiplexing toggle switching element T'11-1 and the multiplexing toggle switching element T'12-1, for example, are examples of the first multiplexing toggle switching element and the second multiplexing toggle switching element, respectively. For example, in a certain image frame, the data line S1 provides a positive polarity data signal to the pixel electrode of the sub-pixel P'11 through the multiplexing toggle switching element T'11-1, and provides a negative polarity data signal to the pixel electrode of the sub-pixel P'12 through the multiplexing toggle switching element T'12-1. In another image frame, the data line S'1 provides a negative polarity data signal to the pixel electrode of the sub-pixel P'11 through the multiplexing toggle switching element T'11-1, and provides a positive polarity data signal to the pixel electrode of the sub-pixel P'12 through the multiplexing toggle switching element T'12-1.

As shown in FIG. 7, the first multiplexing toggle switching element is disposed in the first sub-pixel, and the second multiplexing toggle switching element is disposed in the second sub-pixel. For example, the multiplexing toggle switching element T'11-1 is disposed in the sub-pixel P'11, and the multiplexing toggle switching element T'12-1 is disposed in the sub-pixel P'12.

In some embodiments of the present disclosure, as shown in FIG. 7, each sub-pixel further includes a pixel switching element, and the pixel switching element is connected with a corresponding gate line to receive a gate signal provided by the corresponding gate line. For example, the sub-pixel P'11 includes a pixel switching element T'11-2, and the pixel switching element T'11-2 is connected with a gate line G1 to receive a gate signal provided by the gate line G1. The sub-pixel P'12 includes a pixel switching element T'12-2, and the pixel switching element T'12-2 is also connected with the gate line G1 to receive the gate signal provided by the gate line G1.

As shown in FIG. 7, the pixel switching element and the first multiplexing toggle switching element in the first sub-pixel are connected in series between the data line and the pixel electrode, and the pixel switching element and the second multiplexing toggle switching element in the second sub-pixel are connected in series between the data line and the pixel electrode. For example, the pixel switching element T'11-2 and the multiplexing toggle switching element T'11-1 in the sub-pixel P'11 are connected in series between the data line S1 and the pixel electrode. The pixel switching element T'12-2 and the multiplexing toggle switching element T'12-1 in the sub-pixel P'12 are connected in series between the data line and the pixel electrode.

In this pixel driving architecture, a multiplexing toggle switching element used for multiplexing a data line is disposed in each sub-pixel, thus facilitating individual control of each sub-pixel.

Another aspect of the present disclosure provides a liquid crystal display panel. The liquid crystal display panel includes a pixel array. The pixel array includes a plurality of gate lines, a plurality of data lines and a plurality of sub-pixels, the plurality of sub-pixels are arranged in a plurality of rows and a plurality of columns, each gate line provides a gate signal for one row of sub-pixels, each data line provides data signals for two adjacent columns of sub-pixels, and each sub-pixel is connected with a corresponding gate line and a corresponding data line; a first gate line corresponding to a first row of sub-pixels among the plurality of rows of sub-pixels is configured to provide a first gate signal to the first row of sub-pixels, and the first gate signal includes an on period and an off period used to control the first row of sub-pixels to be turned on and off respectively; each data line is configured to provide, during the on period of the first gate signal, a positive polarity data signal for a first sub-pixel in two adjacent columns and a negative polarity data signal for a second sub-pixel in the two adjacent columns, respectively; during the on period of the first gate signal, each data line is configured such that a first writing time length of the negative polarity data signal is less than a second writing time length of the positive polarity data signal; the on period of the first gate signal includes a first sub-on period and a second sub-on period; during the on period of the first gate signal, each data line being configured such that the first writing time length of the negative polarity data signal is less than the second writing time length of the positive polarity data signal includes: the positive polarity data signal being applied to the first sub-pixel during the first sub-on period, the negative polarity data signal being applied to the second sub-pixel during the second sub-on period, and a time length of the first sub-on period being greater than a time length of the second sub-on period. The liquid crystal display panel can improve the picture quality and yield of the display panel, and alleviate the problem that the liquid crystal display panel is prone to uneven display, afterimage, and even erroneous charging of negative polarity data, etc.

In some embodiments of the present disclosure, each sub-pixel includes a pixel electrode, and each data line is electrically connected with the pixel electrode of the first sub-pixel through a first multiplexing toggle switching element, and is electrically connected with the pixel electrode of the second sub-pixel through a second multiplexing toggle switching element.

In some embodiments of the present disclosure, the first multiplexing toggle switching element is connected with a first control line to receive a first control signal provided by the first control line, the first multiplexing toggle switching element is configured to be turned on and off in response to a control of the first control signal, the second multiplexing toggle switching element is connected with a second control line to receive a second control signal provided by the second control line, and the second multiplexing toggle switching element is configured to be turned on and off in response to a control of the second control signal.

In some embodiments of the present disclosure, the first multiplexing toggle switching element and the second multiplexing toggle switching element are disposed at the periphery of the liquid crystal display panel, one column of sub-pixels in which the first sub-pixel is located share the first multiplexing toggle switching element, and one column of sub-pixels in which the second sub-pixel is located share the second multiplexing toggle switching element.

In some embodiments of the present disclosure, the first multiplexing toggle switching element is disposed in the first sub-pixel, and the second multiplexing toggle switching element is disposed in the second sub-pixel.

In some embodiments of the present disclosure, each sub-pixel further includes a pixel switching element, the pixel switching element is connected with a corresponding gate line to receive a gate signal provided by the corresponding gate line,

- the pixel switching element in the first sub-pixel and the first multiplexing toggle switching element are connected in series between the data line and the pixel electrode, and
- the pixel switching element in the second sub-pixel and the second multiplexing toggle switching element are connected in series between the data line and the pixel electrode.

The liquid crystal display panel provided by the above embodiment of the present disclosure can be the pixel driving architecture of the liquid crystal display panel illustrated by any of the driving methods described above, such as the pixel driving architectures shown in FIG. 2B, FIG. 3A, FIG. 6 and FIG. 7. Specific functions and components of the liquid crystal display panel can refer to the relevant description of the driving method, and details are not repeated here. For example, the components and structures of the liquid crystal display panel shown in FIG. 2B, FIG. 3A, FIG. 6 and FIG. 7 are only exemplary, not restrictive, and the liquid crystal display panel can further include other components and structures as needed.

FIGS. 8A-8D show some other exemplary pixel driving architectures of a liquid crystal display panel applying a driving method provided by at least one embodiment of the present disclosure.

Figure 8A:
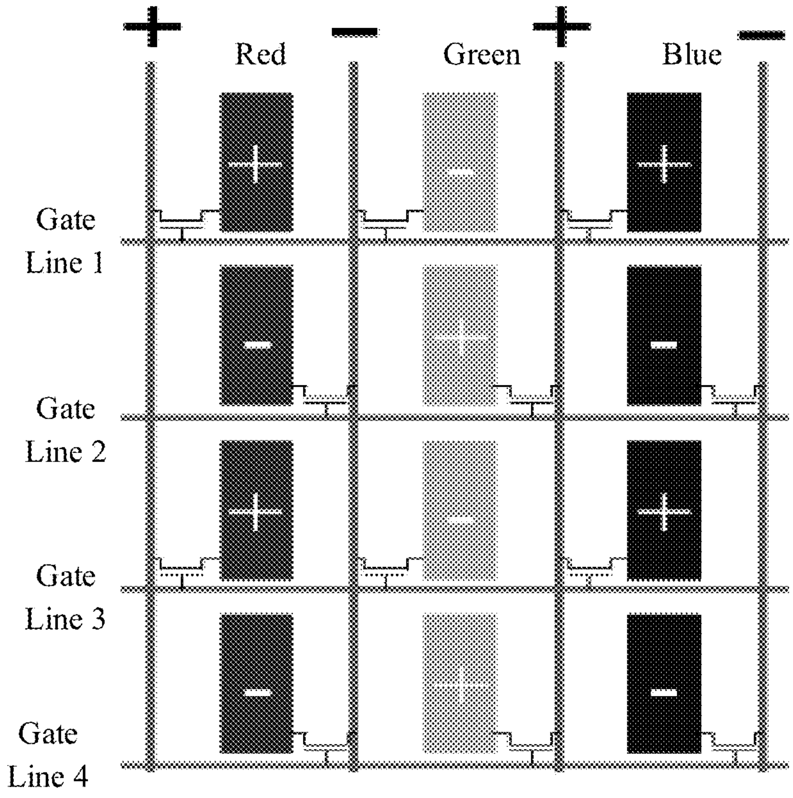
FIGS. 8A-8D show some other pixel driving architectures of a liquid crystal display panel applying a driving method provided by at least one embodiment of the present disclosure.

For example, in the pixel driving architecture of FIG. 8A, each gate line (e.g., gate lines 1-4) is electrically connected with one row of sub-pixels, and the sub-pixels located in the same column and in adjacent rows are connected with two different data lines, respectively. For example, the red sub-pixel in the first row is connected with the data line 1, and the red sub-pixel in the second row is connected with the data line 2. The pixel driving architecture shown in FIG. 8A is called "single gate line +Z" architecture.

Figure 8B:
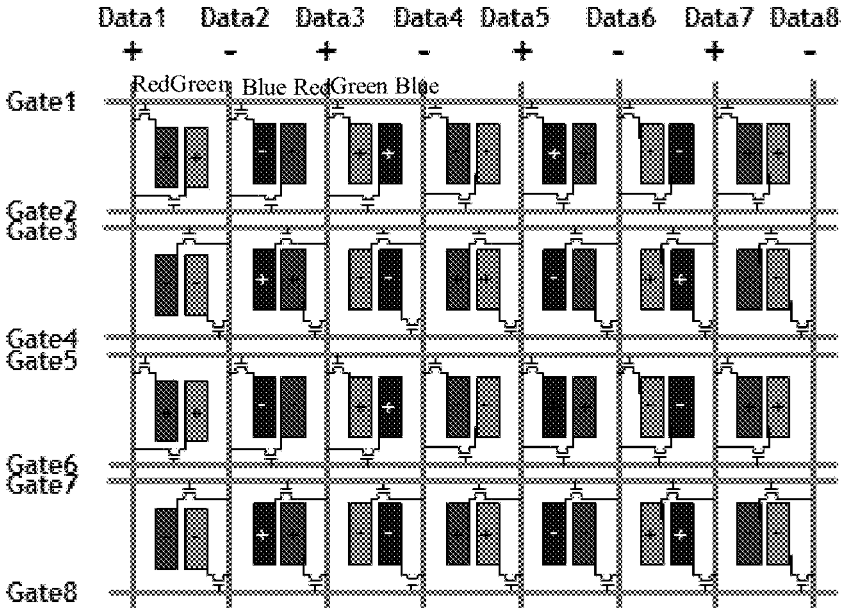

For example, in the pixel driving architecture of FIG. 8B, a plurality of gate lines and a plurality of data lines are included. The plurality of gate lines can include, for example, gate lines Gate1-Gate8, and the plurality of data lines can include, for example, data lines Data1-Data8. Each row of sub-pixels is connected with two gate lines, and for example, the sub-pixels in the first row are connected with the gate line Gate1 and the gate line Gate2. The sub-pixels located in the same row and in adjacent columns are connected with two different gate lines, respectively. For example, the red sub-pixel in the first column is connected with the gate line Gate1, and the green sub-pixel in the second column is connected with the gate line Gate2.

In the pixel driving architecture of FIG. 8B, two adjacent sub-pixels are connected with the same data line, and the sub-pixels located in the same column and in adjacent rows are connected with two different data lines, respectively. For example, the red sub-pixel in the first row is connected with the data line Data1, and the red sub-pixel in the second row is connected with the data line Data2. Taking the first row as an example, the red sub-pixel in the first column is connected with the data line Data1, and the green sub-pixel in the second column is also connected with the data line Data1.

For example, each row of sub-pixels is arranged as a red sub-pixel, a green sub-pixel, a blue sub-pixel, a red sub-pixel, a green sub-pixel and a blue sub-pixel, and it is repeated according to this pattern. As shown in FIG. 8B, the first red sub-pixel is connected with the gate line Gate1, the first green sub-pixel is connected with the gate line Gate2, the first blue sub-pixel is connected with the gate line Gate1, the second red sub-pixel is connected with the gate line Gate2, the second green sub-pixel is connected with the gate line Gate1, and the second blue sub-pixel is connected with the gate line Gate2. That is, in the pixel driving architecture of FIG. 8B, multiple sub-pixels emitting light of the same color in the same row are connected with two different gate lines, respectively. The pixel driving architecture shown in FIG. 8A is called "double gate line +Z-2" architecture.

Figure 8C:
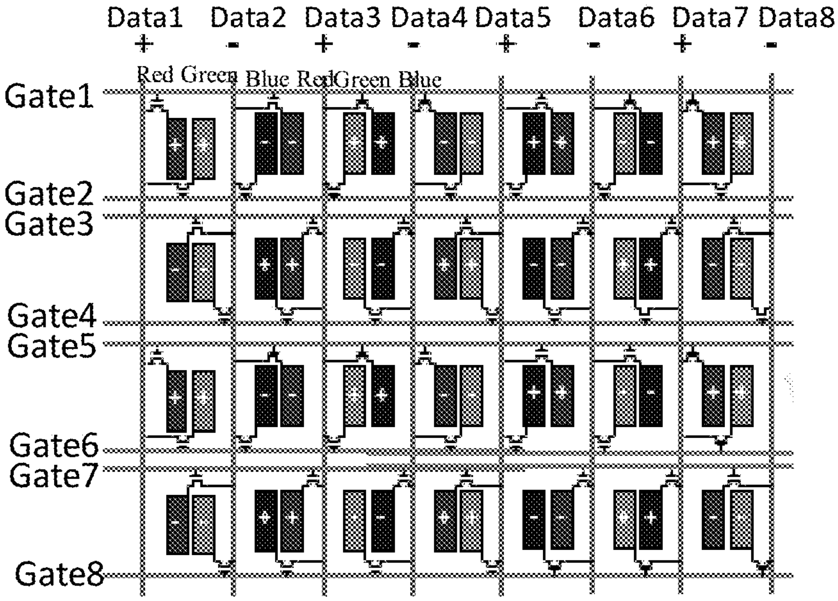

For example, in the pixel driving architecture of FIG. 8C, each row of sub-pixels is connected with two gate lines, and for example, the first row of sub-pixels is connected with the gate line Gate1 and the gate line Gate2. In the pixel driving architecture of FIG. 8C, two adjacent sub-pixels are connected with the same data line, and the sub-pixels located in the same column and in adjacent rows are connected with two different data lines, respectively. For example, the red sub-pixel in the first row is connected with the data line Data1, and the red sub-pixel in the second row is connected with the data line Data2. Taking the first row as an example, the red sub-pixel in the first column is connected with the data line Data1, and the green sub-pixel in the second column is also connected with the data line Data1.

In the pixel driving architecture of FIG. 8C, the sub-pixels emitting light of the same color in the same row are connected with the same gate line. For example, all red sub-pixels are connected with the gate line Gate1, and all green sub-pixels are connected with the gate line Gate2. The pixel driving architecture shown in FIG. 8C is called "double gate line +Z-1" architecture.

Figure 8D:
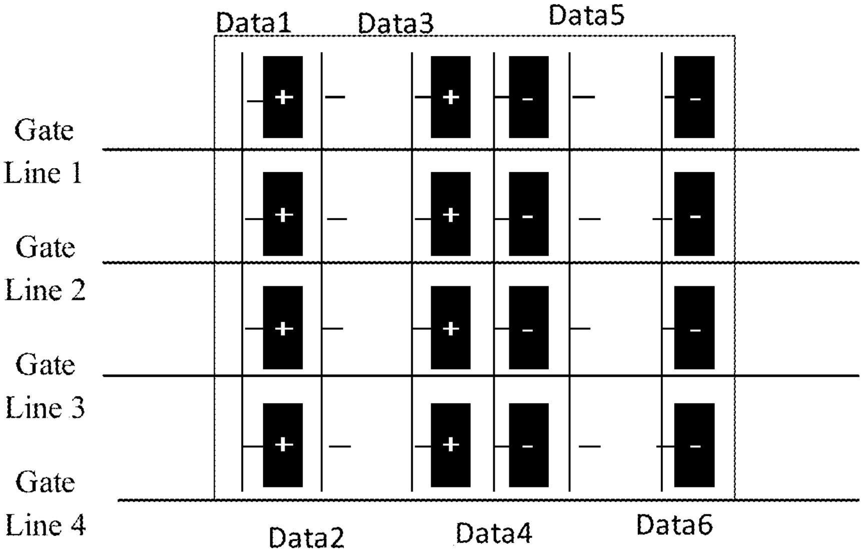

For example, in the pixel driving architecture of FIG. 8D, a plurality of gate lines and a plurality of data lines are included. The plurality of gate lines can include, for example, gate lines 1-4, and the plurality of data lines can include, for example, data lines Data1-Data6. Each row is connected with one gate line, and the sub-pixels in the same column are connected with the same data line.

In FIGS. 8A-8D, the "+" represents a positive polarity data signal, and the "−" represents a negative polarity data signal. It should be noted that the architectures shown in FIGS. 8A-8D are merely examples, and have no limitation on the present disclosure. For example, the pixel array in the liquid crystal display panel ca include more gate lines, data lines and sub-pixel units, and the settings of positive polarity data signals and negative polarity data signals can also be different from those shown in the examples of FIGS. 8A-8D.

The driving method in the foregoing embodiments provided by the present disclosure can be widely applied to respective liquid crystal display panels, as shown in the architectures of FIGS. 8A-8D.

The embodiments of the present disclosure improve the defects (such as uneven display, afterimage, etc.) caused by different charging time due to different output characteristics of thin film transistors under positive and negative polarities by adjusting the writing time lengths of positive and negative polarities, so as to further improve the picture quality and quality of the display device.

At least one embodiment of the present invention further provides a display device, which includes the liquid crystal display panel provided by any embodiment of the present disclosure. For example, the display device can be any product or component having display function, such as a mobile phone, a tablet computer, a television, a display, a laptop computer, a digital photo frame, a navigator, etc.

The following should be noted:

(1) Only the structures involved in the embodiments of the present disclosure are illustrated in the drawings of the embodiments of the present disclosure, and other structures can refer to usual designs;

(2) The embodiments and features in the embodiments of the present disclosure may be combined in case of no conflict to acquire new embodiments.

What have been described above merely are exemplary embodiments of the present disclosure, and not intended to define the scope of the present disclosure, and the scope of the present disclosure is determined by the appended claims.

The invention claimed is:

1. A driving method of a liquid crystal display panel, wherein the liquid crystal display panel comprises a pixel array, the pixel array comprises a plurality of gate lines, a plurality of data lines and a plurality of sub-pixels, the plurality of sub-pixels are arranged in a plurality of rows and a plurality of columns, each of the plurality of gate lines provides a gate signal for at least one row of sub-pixels, each of the plurality of data lines provides a data signal for at least one column of sub-pixels, each sub-pixel is connected with a corresponding gate line and a corresponding data line, and the driving method comprises:

providing a first gate signal to a first gate line corresponding to a first row of sub-pixels among the plurality of rows of sub-pixels, wherein the first gate signal comprises an on period and an off period used to control the first row of sub-pixels to be turned on and off respectively;

writing, during the on period of the first gate signal, a plurality of first data signals to sub-pixels among the first row of sub-pixels through the plurality of data lines, wherein the plurality of first data signals comprise a positive polarity data signal and a negative polarity data signal, and during the on period of the first gate signal, a first writing time length of the negative polarity data signal is less than a second writing time length of the positive polarity data signal;

wherein a delay time of the negative polarity data signal relative to a starting time point of the on period corresponding to the first gate signal is a first time length, a delay time of the positive polarity data signal relative to the starting time point of the on period corresponding to the first gate signal is a second time length, and the first time length is greater than the second time length, so that the first writing time length of the negative polarity data signal is less than the second writing time length of the positive polarity data signal during the on period of the first gate signal.

2. The driving method according to claim 1, wherein each of the plurality of data lines provides data signals for two adjacent columns of sub-pixels, during the on period of the first gate signal, each of the plurality of data lines provides a positive polarity data signal and a negative polarity data signal for a first sub-pixel and a second sub-pixel located in a same row and in two adjacent columns, respectively, the on period of the first gate signal comprises a first sub-on period and a second sub-on period, the positive polarity data signal is applied to the first sub-pixel during the first sub-on period, the negative polarity data signal is applied to the second sub-pixel during the second sub-on period, and a time length of the first sub-on period is greater than a time length of the second sub-on period.

3. The driving method according to claim 2, wherein each of the plurality of sub-pixels comprises a pixel electrode, and each of the plurality of data lines provides the positive polarity data signal to the pixel electrode of the first sub-pixel through a first multiplexing toggle switching element, and provides the negative polarity data signal to the pixel electrode of the second sub-pixel through a second multiplexing toggle switching element.

4. The driving method according to claim 3, wherein the first multiplexing toggle switching element is connected with a first control line to receive a first control signal provided by the first control line, the first multiplexing toggle switching element is configured to be turned on and off in response to a control of the first control signal, the second multiplexing toggle switching element is connected with a second control line to receive a second control signal provided by the second control line, and the second multiplexing toggle switching element is configured to be turned on and off in response to a control of the second control signal.

5. The driving method according to claim 4, wherein the first sub-on period and the second sub-on period are the same as an on period of the first multiplexing toggle switching element and an on period of the second multiplexing toggle switching element, respectively.

6. The driving method according to claim 5, wherein the first multiplexing toggle switching element and the second multiplexing toggle switching element are disposed at a periphery of the liquid crystal display panel, one column of sub-pixels in which the first sub-pixel is located share the first multiplexing toggle switching element, and one column of sub-pixels in which the second sub-pixel is located share the second multiplexing toggle switching element.

7. The driving method according to claim 3, wherein the first multiplexing toggle switching element is disposed in the first sub-pixel, and the second multiplexing toggle switching element is disposed in the second sub-pixel.

8. The driving method according to claim 7, wherein each of the plurality of sub-pixels further comprises a pixel switching element, the pixel switching element is connected with a corresponding gate line to receive a gate signal provided by the corresponding gate line, the pixel switching element and the first multiplexing toggle switching element in the first sub-pixel are connected in series between the data line and the pixel electrode, and the pixel switching element and the second multiplexing toggle switching element in the second sub-pixel are connected in series between the data line and the pixel electrode.

9. The driving method according to claim 3, wherein the first multiplexing toggle switching element and the second multiplexing toggle switching element are disposed at a periphery of the liquid crystal display panel, one column of sub-pixels in which the first sub-pixel is located share the first multiplexing toggle switching element, and one column of sub-pixels in which the second sub-pixel is located share the second multiplexing toggle switching element.

10. The driving method according to claim 1, wherein the starting time point of the on period corresponding to the first gate signal relative to the negative polarity data signal and the starting time point of the on period corresponding to the first gate signal relative to the positive polarity data signal are the same or different.

11. The driving method according to claim 10, wherein the first gate signal further comprises a transition period between the on period and the off period adjacent to each other, the first time length is greater than the second time length by a preset time length, and the preset time length is a difference between a writing time length of the negative polarity data signal and a writing time length of the positive polarity data signal during the transition period of the first gate signal.

12. The driving method according to claim 1, wherein the first gate signal further comprises a transition period between the on period and the off period adjacent to each other, the first time length is greater than the second time length by a preset time length, and the preset time length is a difference between a writing time length of the negative polarity data signal and a writing time length of the positive polarity data signal during the transition period of the first gate signal.

13. The driving method according to claim 1, wherein each of the plurality of data lines provides data signals for two adjacent columns of sub-pixels, during the on period of the first gate signal, each of the plurality of data lines provides a positive polarity data signal and a negative polarity data signal for a first sub-pixel and a second sub-pixel located in a same row and in two adjacent columns, respectively, the on period of the first gate signal comprises a first sub-on period and a second sub-on period, the positive polarity data signal is applied to the first sub-pixel during the first sub-on period, the negative polarity data signal is applied to the second sub-pixel during the second sub-on period, and a time length of the first sub-on period is greater than a time length of the second sub-on period.

14. A liquid crystal display panel, comprising a pixel array, wherein the pixel array comprises a plurality of gate lines, a plurality of data lines and a plurality of sub-pixels, the plurality of sub-pixels are arranged in a plurality of rows and a plurality of columns, each of the plurality of gate lines provides a gate signal for one row of sub-pixels, each of the plurality of data lines provides data signals for two adjacent columns of sub-pixels, and each of the plurality of sub-pixels is connected with a corresponding gate line and a corresponding data line, a first gate line corresponding to a first row of sub-pixels among the plurality of rows of sub-pixels is configured to provide a first gate signal to the first row of sub-pixels, wherein the first gate signal comprises an on period and an off period used to control the first row of sub-pixels to be turned on and off respectively, each of the plurality of data lines is configured to provide, during the on period of the first gate signal, a positive polarity data signal for a first sub-pixel in two adjacent columns and a negative polarity data signal for a second sub-pixel in the two adjacent columns, respectively, wherein during the on period of the first gate signal, each of the plurality of data lines is configured such that a first writing time length of the negative polarity data signal is less than a second writing time length of the positive polarity data signal, wherein the on period of the first gate signal comprises a first sub-on period and a second sub-on period, during the on period of the first gate signal, each of the plurality of data lines being configured such that the first writing time length of the negative polarity data signal is less than the second writing time length of the positive polarity data signal, comprises:

the positive polarity data signal being applied to the first sub-pixel during the first sub-on period, the negative polarity data signal being applied to the second sub-pixel during the second sub-on period, and a time length of the first sub-on period being greater than a time length of the second sub-on period.

15. The liquid crystal display panel according to claim 14, wherein each of the plurality of sub-pixels comprises a pixel electrode, and each of the plurality of data lines is electrically connected with the pixel electrode of the first sub-pixel through a first multiplexing toggle switching element, and is electrically connected with the pixel electrode of the second sub-pixel through a second multiplexing toggle switching element.

16. The liquid crystal display panel according to claim 15, wherein the first multiplexing toggle switching element and the second multiplexing toggle switching element are disposed at a periphery of the liquid crystal display panel, one column of sub-pixels in which the first sub-pixel is located share the first multiplexing toggle switching element, and one column of sub-pixels in which the second sub-pixel is located share the second multiplexing toggle switching element.

17. The liquid crystal display panel according to claim 16, wherein each of the plurality of sub-pixels further comprises a pixel switching element, the pixel switching element is connected with a corresponding gate line to receive a gate signal provided by the corresponding gate line, the pixel switching element in the first sub-pixel and the first multiplexing toggle switching element are connected in series between the data line and the pixel electrode, and the pixel switching element in the second sub-pixel and the second multiplexing toggle switching element are connected in series between the data line and the pixel electrode.

18. The liquid crystal display panel according to claim 15, wherein the first multiplexing toggle switching element is connected with a first control line to receive a first control signal provided by the first control line, the first multiplexing toggle switching element is configured to be turned on and off in response to a control of the first control signal, the second multiplexing toggle switching element is connected with a second control line to receive a second control signal provided by the second control line, and the second multiplexing toggle switching element is configured to be turned on and off in response to a control of the second control signal.

19. The liquid crystal display panel according to claim 15, wherein the first multiplexing toggle switching element is disposed in the first sub-pixel, and the second multiplexing toggle switching element is disposed in the second sub-pixel.

* * * * *